United States Patent
Watanabe et al.

(10) Patent No.: US 10,946,486 B2
(45) Date of Patent: Mar. 16, 2021

(54) FLUX-CORED WIRE, MANUFACTURING METHOD OF WELDED JOINT, AND WELDED JOINT

(71) Applicant: NIPPON STEEL & SUMITOMO METAL CORPORATION, Tokyo (JP)

(72) Inventors: Kotaro Watanabe, Tokyo (JP); Tatsuya Kumagai, Tokyo (JP); Hiroki Fujimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 249 days.

(21) Appl. No.: 16/073,192

(22) PCT Filed: Mar. 8, 2016

(86) PCT No.: PCT/JP2016/057246
§ 371 (c)(1),
(2) Date: Jul. 26, 2018

(87) PCT Pub. No.: WO2017/154122
PCT Pub. Date: Sep. 14, 2017

(65) Prior Publication Data
US 2019/0030655 A1    Jan. 31, 2019

(51) Int. Cl.
*B23K 35/02*   (2006.01)
*B23K 35/30*   (2006.01)
(Continued)

(52) U.S. Cl.
CPC .......... *B23K 35/0266* (2013.01); *B23K 35/02* (2013.01); *B23K 35/30* (2013.01);
(Continued)

(58) Field of Classification Search
CPC .... B23K 35/0266; B23K 35/02; B23K 35/30; B23K 35/3053; B23K 35/36;
(Continued)

(56) References Cited

U.S. PATENT DOCUMENTS

2004/0020912 A1* 2/2004 Hara ................. B23K 35/3053
219/145.22
2011/0114606 A1  5/2011 Suzuki
(Continued)

FOREIGN PATENT DOCUMENTS

CA    2 926 569 A1   5/2015
CN    104661784 A    5/2015
(Continued)

OTHER PUBLICATIONS

International Search Report for PCT/JP2016/057246 dated Jun. 7, 2016.
(Continued)

*Primary Examiner* — Brian W Jennison
(74) *Attorney, Agent, or Firm* — Birch, Stewart, Kolasch & Birch, LLP

(57) ABSTRACT

According to an aspect of the present invention, there is provided a flux-cored wire including a steel sheath and a flux that fills the steel sheath. The flux contains fluorides of which a total value $\alpha$ of F-equivalent values is 0.21% or more, oxides of which the total value $\beta$ of amounts ranges from 0.30% to 3.50%, and carbonates of which a total value of amounts ranges from 0% to 3.50%. An amount of CaO ranges from 0% to 0.20%. An amount of iron powder ranges from 0% to less than 10.0%. A Y-value is 5.0% or less. The amount of $CaF_2$ is less than 0.50%. The amount of Ti oxides ranges from 0.10% to 2.50%. A ratio of $\alpha$ to $\beta$ ranges from 0.10 to 4.00. A total value of amounts of $MgCO_3$, $Na_2CO_3$, and $LiCO_3$ ranges from 0% to 3.00%. A chemical composition excluding the fluorides, the oxides, the CaO, the carbonates, and the iron powder is within a predetermined range. Ceq ranges from 0.10% to 0.44%.

20 Claims, 5 Drawing Sheets

(51) Int. Cl.
  *B23K 35/368* (2006.01)
  *B23K 35/365* (2006.01)
  *B23K 35/36* (2006.01)
  *C22C 38/12* (2006.01)
  *C22C 38/04* (2006.01)
  *B23K 35/362* (2006.01)

(52) U.S. Cl.
  CPC .......... *B23K 35/3053* (2013.01); *B23K 35/36* (2013.01); *B23K 35/362* (2013.01); *B23K 35/3602* (2013.01); *B23K 35/365* (2013.01); *B23K 35/3605* (2013.01); *B23K 35/368* (2013.01); *C22C 38/04* (2013.01); *C22C 38/12* (2013.01)

(58) Field of Classification Search
  CPC ............ B23K 35/3602; B23K 35/3605; B23K 35/362; B23K 35/365; B23K 35/368; C22C 38/04; C22C 38/12
  See application file for complete search history.

(56) References Cited

U.S. PATENT DOCUMENTS

| | | | |
|---|---|---|---|
| 2012/0241433 A1 | 9/2012 | Kojima et al. | |
| 2015/0174690 A1 | 6/2015 | Furusako et al. | |
| 2015/0360327 A1 | 12/2015 | Nakamura et al. | |
| 2016/0121433 A1* | 5/2016 | Miyata | C22C 38/48 219/145.22 |
| 2016/0129532 A1* | 5/2016 | Saruwatari | C22C 38/005 219/74 |

FOREIGN PATENT DOCUMENTS

| | | |
|---|---|---|
| CN | 104955610 A | 9/2015 |
| EP | 2952288 A1 | 12/2015 |
| JP | 1-271098 A | 10/1989 |
| JP | 6-155079 A | 6/1994 |
| JP | 8-257785 A | 10/1996 |
| JP | 11-147196 A | 6/1999 |
| JP | 2002-331384 A | 11/2002 |
| JP | 2005-144539 A | 6/2005 |
| JP | 2007-90376 A | 4/2007 |
| JP | 2009-255168 A | 11/2009 |
| JP | 2010-194595 A | 9/2010 |
| JP | 2013-18012 A | 1/2013 |
| JP | 2013-151001 A | 8/2013 |
| JP | 5440744 B1 | 3/2014 |
| JP | 2015-6693 A | 1/2015 |
| JP | 2015-44236 A | 3/2015 |
| JP | 2015-83316 A | 4/2015 |
| JP | 5696824 B1 | 4/2015 |
| JP | 2015-110247 A | 6/2015 |
| JP | 2016-83677 A | 5/2016 |
| KR | 10-2011-0055421 A | 5/2011 |
| WO | WO 2011/074689 A1 | 6/2011 |
| WO | WO 2015/068273 A1 | 5/2014 |
| WO | WO 2015/068443 A1 | 5/2015 |

OTHER PUBLICATIONS

Written Opinion of the International Searching Authority for PCT/JP2016/057246 (PCT/ISA/237) dated Jun. 7, 2016.
Korean Office Action, dated Dec. 31, 2019, for corresponding Korean Application No. 10-2018-7024729, with an English translation.
Extended European Search Report, dated Oct. 15, 2019, for European Application No. 16893454.5.
Chinese Office Action and Search Report, dated Mar. 27, 2020, for corresponding Chinese Application No. 201680083006.7, with English translations.

* cited by examiner

FLUX-CORED WIRE, MANUFACTURING METHOD OF WELDED JOINT, AND WELDED JOINT

TECHNICAL FIELD OF THE INVENTION

The present invention relates to a flux-cored wire, a manufacturing method of a welded joint, and a welded joint. Particularly, the present invention relates to a flux-cored wire for gas shield arc welding, in which preheating work for preventing a cold crack can be omitted or the preheating temperature can be lowered, and welding can be performed without generating a hot crack when performing welding of a high-hardness steel sheet which has a high carbon content and is utilized in the fields of construction equipment, industrial equipment field, and the like, a gas shield arc welding method using the flux-cored wire, and a welded joint which can be obtained by the welding method.

RELATED ART

Components of construction equipment for mine excavation and civil engineering work are likely to require replacement due to wearness. In order to lengthen a service life of such components, the components are manufactured by using a wear resistant steel and a cast steel in which hardness is enhanced.

Particularly, in components requiring wear resistance, sometimes a wear resistant steel sheet and a high alloy cast steel of which hardness is within HB450 to HB600 class of Brinell hardness are used. In order to enhance hardness, such steel sheets contain a large amount of C and have high hardenability. In a case where such a high-carbon steel is welded, a weld, particularly a welded heat-affected zone (which will hereinafter be referred to as a "HAZ") is remarkably hardened. Accordingly, a cold crack is very likely to be generated. A cold crack is a crack generated in a weld when the temperature of the weld drops to the vicinity of an ordinary temperature after welding. A cold crack is caused due to hydrogen invading the weld at the time of welding. Although the cold crack is caused depending on the sheet thickness, a welding heat input, and the like, in order to prevent this cold crack, there is a need to perform preheating or to further increasing the preheating temperature. However, in a case where the sheet thickness is large, preheating at a high temperature requires a long heating time, thereby increasing a work load. Therefore, there is demand for a technology which can sufficiently prevent a cold crack at the time of welding of a steel sheet having a large C content even in a case where preheating work is omitted or the preheating temperature in preheating work is lowered.

In addition, the C content in a wear resistant steel sheet and a high alloy cast steel within HB450 to HB600 class is at least 0.2% and exceeds 0.5% sometimes. In a case where a welded joint is manufactured by using a steel sheet having a high C content, due to dilution by a parent material at the time of welding (a phenomenon in which a weld metal formed of a filler metal is diluted by the melted parent material), the C content of the weld metal increases, so that a hot crack is likely to occur. A hot crack is a crack generated in a weld when the temperature of the weld is a high temperature such as a solidification temperature range or immediately below thereof, after welding. Preventing a hot crack leads to various restrictions related to welding procedure conditions such as a groove shape, a laminating procedure, and welding current and voltage. Therefore, there is demand for a technology which can sufficiently prevent a hot crack at the time of welding a steel sheet having a large C content.

For example, as welding materials for achieving the various demands described above, wires are proposed in Patent Documents 1 to 12.

Patent Document 1 discloses a technology in which the amount of diffusion hydrogen in a weld metal immediately after welding is reduced to a range approximately from 3.0 to 4.0 ml/100 g by mixing a proper amount of Mg into a covering material of a covered arc welding material, thereby ameliorating cold-cracking resistance properties of the weld metal of a welded joint manufactured from a steel material having tensile strength ranging from 880 to 1,180 MPa.

Patent Document 2 discloses a technology in which a cold crack of a weld metal is prevented by limiting a hydrogen content included in a flux-cored wire for gas shield arc welding.

Patent Document 3 discloses a flux-cored wire for a high tensile strength steel within 490 to 780 MPa class, in which cold-cracking resistance properties of a weld metal are improved by containing V in a sheath or a flux.

Patent Document 4 discloses a flux-cored wire for gas shield arc welding, which includes a titania-based flux and in which the ratio of a sheath cross-sectional area to a wire cross-sectional area ranges from 90% to 97%. According to Patent Document 4, during fillet welding, the amount of welding distortion can be reduced.

Patent Document 5 discloses a flux-cored wire for gas shield arc welding, in which the amount of fluorides, the C content, the Mn content, and the V content are controlled to be within a predetermined range. According to Patent Document 5, a ductility deterioration crack can be prevented.

Patent Document 6 discloses a flux-cored wire for gas shield arc welding, which includes metal fluorides; neutral oxides or basic oxides; one or two of Al and Mg; a deoxidizer; and a caking additive, while the amounts of C, Si, and Mn are within a predetermined range. According to Patent Document 6, there is provided a flux-cored wire which can obtain a weld metal having excellent welding workability and favorable low-temperature toughness.

Patent Document 7 discloses a metal-based flux-cored wire for gas shield arc welding, which contains a compound of at least one selected from the group consisting of oxides including one or at least two of alkali metals, fluorides, and carbonates, while a specific surface area is controlled to be within a predetermined range. According to Patent Document 7, there is provided a flux-cored wire having excellent weld penetration properties and favorable mechanical properties and welding workability of a weld metal.

Patent Document 8 discloses a flux-cored wire for gas shield arc welding, which contains $TiO_2$, alkali metal fluorides, and PTFE, in which the ratio of the amount of the alkali metal fluorides and the amount of the PTFE is controlled to be within a predetermined range, and in which the amount of alkaline earth metal fluorides is limited to a predetermined amount or smaller. According to Patent Document 8, there is provided a flux-cored wire in which diffusion hydrogen is prevented from entering a weld at the time of arc welding and which has excellent moisture absorption resistant properties and favorable welding workability.

Patent Document 9 discloses a flux-cored wire for gas shield arc welding for an anti-weathering steel, which includes Ti oxides, Si oxides, Al oxides, a Na compound, a K compound, and metal fluorides, while apparent density and the average grain diameter of the Al oxides are controlled to be within a predetermined range. According to Patent Document 9, there is provided a flux-cored wire which can obtain a weld metal having favorable welding workability in all-position welding and having excellent strength and toughness, when an anti-weathering steel is welded.

Patent Document 10 discloses a flux-cored wire for gas shield arc welding, which includes metal fluorides and $TiO_2$, while the Mg content and the Al content are controlled to be within a range regulated by a predetermined mathematical expression. According to Patent Document 10, there is provided a flux-cored wire which can obtain a weld having favorable welding workability and excellent low-temperature toughness.

Patent Document 11 discloses a flux-cored wire for arc welding, which includes metal powder of 75 weight % or more, and in which one or both of a steel sheath and a flux contain V. According to Patent Document 11, there is provided a flux-cored wire in which preheating can be omitted or the preheating temperature can be drastically lowered, and a weld having excellent crack resistant properties can be obtained, at the time of welding a high tensile strength steel of 490 MPa class or higher.

Patent Document 12 discloses a flux-cored wire for gas shield arc welding of a high tensile strength steel, which includes $TiO_2$, $SiO_2$, $ZrO_2$, $Al_2O_3$, and fluorides, in which the amounts thereof are controlled to be within a range regulated by a predetermined mathematical expression, and in which the hydrogen content is limited to a predetermined amount or smaller. According to Patent Document 12, there is provided a flux-cored wire which can obtain a weld metal having excellent welding workability and excellent mechanical properties.

Patent Document 13 discloses a manufacturing method of a welded joint using a flux-cored wire containing fluorides which can reduce the amount of diffusion hydrogen. According to Patent Document 13, there is provided a manufacturing method of a welded joint, in which a cold crack can be prevented from being generated without preheating a steel sheet of HV380 or higher to 10° C. or higher.

However, all of the technologies are targeted at welding of a steel sheet having a smaller carbon content than a high carbon steel such as a wear resistant steel and a high alloy cast steel within HB450 to HB600 class. The technologies cannot sufficiently prevent a cold crack of a HAZ when a high carbon steel is welded. Moreover, in Patent Documents 1 to 3, there is no particular consideration for a hot crack.

In Patent Document 4, there is no consideration for a way of reducing the amount of diffusion hydrogen of a weld metal. In consideration of the disclosed chemical composition, the flux-cored wire according to Patent Document 4 cannot reduce the amount of diffusion hydrogen to the extent that preheating can be omitted to avoid a cold crack.

The flux-cored wire according to Patent Document 5 requires a large amount of $CaF_2$. Since $CaF_2$ increases the amount of spatter in welding in which 100% $CO_2$ gas is used as a shielding gas. Therefore, the technology in Patent Document 5 cannot improve weldability.

The flux-cored wire according to Patent Document 6 also requires a large amount of $CaF_2$, so that weldability cannot be improved. In addition, since the flux-cored wire according to Patent Document 6 includes a large amount of Mg, it is assumed that the amount of diffusion hydrogen of a weld metal cannot be sufficiently reduced.

The flux-cored wire according to Patent Document 7 is a metal-based wire in which a flux includes no slag forming agent. The welding slag which can be obtained by the slag forming agent has an effect of removing impurities from a molten pool, an effect of arranging a bead width and a bead wave and achieving favorable appearance of a weld metal, and an effect of preventing oxidation and nitriding of a weld metal immediately after solidification. However, according to the wire disclosed in Patent Document 7, the effects of welding slag cannot be obtained.

The flux-cored wire according to Patent Document 8 cannot reduce the amount of diffusion hydrogen in a weld metal to be smaller than 1.9 ml/100 g. The inventors have ascertained that preheating cannot be omitted or the preheating temperature cannot be lowered by improving cold-cracking properties of a weld metal unless the amount of diffusion hydrogen in the weld metal is reduced to 1.0 ml/100 g or smaller. Moreover, Patent Document 8 does not disclose a way of reducing the amount of spatter in welding using 100% $CO_2$ gas as a shielding gas. In a case where the wire of Patent Document 8 is applied to welding using 100% $CO_2$ gas, it is assumed that an excessive amount of spatter is generated and welding workability is degraded.

Patent Document 9 does not disclose a way of improving cold-cracking properties of a weld metal. Particularly, the amount of fluorides disclosed in Patent Document 9 is not sufficient to reduce the amount of diffusion hydrogen of a weld metal.

The flux-cored wire according to Patent Document 10 requires a large amount of $CaF_2$. Since $CaF_2$ increases the amount of spatter in welding in which 100% $CO_2$ gas is used as a shielding gas. Therefore, the technology in Patent Document 10 cannot improve weldability.

The flux-cored wire according to Patent Document 11 requires a large amount of $CaF_2$ of 1.5% or more. Since $CaF_2$ increases the amount of spatter in welding in which 100% $CO_2$ gas is used as a shielding gas. Therefore, the technology in Patent Document 11 cannot improve weldability.

The flux-cored wire according to Patent Document 12 requires $TiO_2$ of 2.5% or more. Therefore, it is assumed that a welded joint manufactured by the technology disclosed in Patent Document 12 has poor low-temperature toughness.

The manufacturing method of a welded joint disclosed in Patent Document 13 uses a flux-cored wire required to contain a large amount of $CaF_2$, as the filler material. Accordingly, the amount of spatter is increased in a case where 100% $CO_2$ gas is used as a shielding gas. Therefore, weldability cannot be improved.

Moreover, generally, if welding is performed by using an austenitic stainless steel welding material, the amount of hydrogen invading a weld metal is considerably reduced. Accordingly, cold-cracking sensitivity can be lowered. However, in a case where a steel sheet which becomes a parent material of a welded joint has a high C content, even in a weld metal obtained by using the austenitic stainless steel welding material, a hot crack is likely to occur. In addition, the austenitic stainless steel welding material is expensive.

From those described above, it is required that a weld metal, in which a cold crack and a hot crack are unlikely to be generated, is formed by the gas shield arc welding, in manufacturing a welded joint having a high carbon steel such as a wear resistant steel and a high alloy cast steel within HB450 to HB600 class, as a parent material. Moreover, in welding using inexpensive 100% $CO_2$ gas as a shielding gas, it is required that the generation amount of spatter is prevented.

PRIOR ART DOCUMENT

Patent Documents

[Patent Document 1] Japanese Unexamined Patent Application, First Publication No. H11-147196
[Patent Document 2] Japanese Unexamined Patent Application, First Publication No. 2009-255168
[Patent Document 3] Japanese Unexamined Patent Application, First Publication No. H08-257785
[Patent Document 4] Japanese Unexamined Patent Application, First Publication No. 2005-144539
[Patent Document 5] Japanese Patent No. 5440744 [Patent Document 6] Japanese Unexamined Patent Application, First Publication No. H1-271098
[Patent Document 7] Japanese Unexamined Patent Application, First Publication No. 2002-331384
[Patent Document 8] Japanese Unexamined Patent Application, First Publication No. 2007-90376
[Patent Document 9] Japanese Unexamined Patent Application, First Publication No. 2013-151001
[Patent Document 10] Japanese Unexamined Patent Application, First Publication No. H6-155079
[Patent Document 11] Japanese Unexamined Patent Application, First Publication No. H8-257785
[Patent Document 12] Japanese Unexamined Patent Application, First Publication No. 2013-18012
[Patent Document 13] Japanese Patent No. 5696824

DISCLOSURE OF THE INVENTION

Problems to be Solved by the Invention

An object of the present invention is to provide a flux-cored wire which has high toughness, in which a weld having excellent cold-cracking resistance properties and hot-cracking resistance properties can be obtained, and in which a generation amount of spatter during welding can be drastically reduced.

In addition, another object of the present invention is to provide a manufacturing method of a welded joint, in which preheating work for preventing a cold crack of a weld metal can be omitted or a preheating temperature can be lowered, a hot crack of a weld metal can be prevented, and a generation amount of spatter can be drastically reduced.

Moreover, further another object of the present invention is to provide a welded joint which has high strength and high toughness and includes a weld having a favorable bead shape.

Means for Solving the Problem

The details of the present invention are as follows.
(1) According to an aspect of the present invention, there is provided a flux-cored wire including a steel sheath, and a flux that fills the steel sheath. The flux contains: fluorides which include one or at least two selected from the group consisting of $CaF_2$, $MgF_2$, $Na_3AlF_6$, LiF, NaF, $K_2ZrF_6$, $BaF_2$, and $K_2SiF_6$, and of which a total value α of F-equivalent values is 0.21% or more with respect to a total mass of the flux-cored wire; oxides which include one or at least two selected from the group consisting of Fe oxides, Ba oxides, Na oxides, Ti oxides, Si oxides, Zr oxides, Mg oxides, Al oxides, Mn oxides, and K oxides, while excluding CaO, and of which a total value β of amounts ranges from 0.30% to 3.50% by mass % with respect to the total mass of the flux-cored wire; and carbonates which include one or at least two selected from the group consisting of $MgCO_3$, $Na_2CO_3$, $LiCO_3$, $CaCO_3$, $K_2CO_3$, $BaCO_3$, $FeCO_2$ and $MnCO_3$, and of which a total value of amounts ranges from 0% to 3.50% by mass % with respect to the total mass of the flux-cored wire. An amount of the CaO in the flux ranges from 0% to 0.20% by mass % with respect to the total mass of the flux-cored wire. An amount of iron powder in the flux ranges from 0% to less than 10.0% by mass % with respect to the total mass of the flux-cored wire. A Y-value calculated by using Expression 1 is 5.0% or less. The amount of the $CaF_2$ is less than 0.50% by mass % with respect to the total mass of the flux-cored wire. The amount of the Ti oxides ranges from 0.10% to 2.50% by mass % with respect to the total mass of the flux-cored wire. A ratio of the α to the β ranges from 0.10 to 4.00. A total value of amounts of the $MgCO_3$, the $Na_2CO_3$, and the $LiCO_3$ ranges from 0% to 3.00% by mass % with respect to the total mass of the flux-cored wire. A chemical composition excluding the fluorides, the oxides, the CaO, the carbonates, and the iron powder includes, by mass % with respect to the total mass of the flux-cored wire, C: 0.003% to 0.030%, Si: 0.10% to 1.50%, Mn: 0.50% to 3.50%, Mg: 0.10% or less, P: 0.020% or less, S: 0.020% or less, Al: 0.001% to 0.100%, Cu: 0% to 0.50%, Ni: 0% to 0.50%, Cr: 0% to 1.00%, Mo: 0% to 1.00%, Nb: 0% to 0.100%, V: 0% to 0.40%, Ti: 0% to 0.300%, B: 0% to 0.0100%, Bi: 0% to 0.0100%, Ca: 0% to 0.50%, and REM: 0% to 0.0100%, while having a remainder composed of iron and impurities. Ceq calculated by using the following Expression 2 ranges from 0.10% to 0.44%, $$Y=[NaF]+[MgF_2]+[Na_3AlF_6]+1.50\times([K_2SiF_6]\pm[K_2ZrF_6]+[LiF]+[BaF_2])+3.50\times([CaF_2]): \quad \text{Expression 1}$$

here, the chemical formulas with square brackets each indicate, by unit mass % with respect to the total mass of the flux-cored wire, the amount of the fluoride corresponding to each of the chemical formulas, $$Ceq=[C]+[Si]/24+[Mn]/6+[Ni]/40+[Cr]/5+[Mo]/4+[V]/14: \quad \text{Expression 2}$$

here, the element symbols with square brackets each express, by unit mass % with respect to the total mass of the flux-cored wire, the amount of the element corresponding to each of the element symbols included in the chemical composition excluding the fluorides, the oxides, and the carbonates.

(2) In the flux-cored wire according to (1), the chemical composition excluding the fluorides, the oxides, the CaO, the carbonates, and the iron powder may include, by mass % with respect to the total mass of the flux-cored wire, Mg: 0.07% or less.

(3) In the flux-cored wire according to (1) or (2), the chemical composition excluding the fluorides, the oxides, the CaO, the carbonates, and the iron powder may satisfy Expression 3, $$([Mg]+10\times[Al])\leq 0.45: \quad \text{Expression 3}$$

here, the element symbols with square brackets each indicate, by unit mass % with respect to the total mass of the flux-cored wire, the amount of the element corresponding to each of the element symbols included in the chemical composition excluding the fluorides, the oxides, and the carbonates.

(4) In the flux-cored wire according to any one of (1) to (3), the total amount of the carbonates may range from more than 0.30% to 3.50%. The total amount of one or at least two of the $MgCO_3$, the $Na_2CO_3$, and the $LiCO_3$ may range from more than 0.30% to 3.00%.

(5) In the flux-cored wire according to any one of (1) to (4), the total amount of the fluorides may be 0.50% or more in terms of the F-equivalent value.

(6) In the flux-cored wire according to any one of (1) to (5), the Y-value may be 4.0% or less.

(7) In the flux-cored wire according to any one of (1) to (6), the amount of the Ti oxides may range from 0.10% to 1.80% by mass % with respect to the total mass of the flux-cored wire.

(8) In the flux-cored wire according to any one of (1) to (7), the amount of the $CaF_2$ may be 0.20% or less by mass % with respect to the total mass of the flux-cored wire.

(9) In the flux-cored wire according to any one of (1) to (8), the ratio of the α to the β may range from 0.50 to 2.50.

(10) In the flux-cored wire according to any one of (1) to (9), the total amount of $Na_3AlF_6$ and NaF by unit mass % with respect to the total mass of the flux-cored wire may be 50% or more of the total amount of the fluorides by unit mass % with respect to the total mass of the flux-cored wire.

(11) In the flux-cored wire according to any one of (1) to (10), the steel sheath may have a seamless shape.

(12) In the flux-cored wire according to any one of (1) to (10), the steel sheath may have a slit-shaped gap.

(13) The flux-cored wire according to any one of (1) to (12) may further include perfluoropolyether oil that coats a surface of the flux-cored wire.

(14) According to another aspect of the present invention, there is provided a manufacturing method of a welded joint including performing gas shield arc welding of a steel material by using the flux-cored wire according to any one of (1) to (13).

(15) In the manufacturing method of a welded joint according to (14), the steel material may be a steel sheet of which a sheet thickness ranges from 12 to 100 mm, of which a C content ranges from 0.20% to 0.55% by unit mass %, and of which CEN calculated by using Expression 4 ranges from 0.20% to 0.70%; or a steel sheet of which the sheet thickness ranges from 12 to 20 mm, of which the C content ranges from 0.20% to 0.55% by unit mass %, and of which the CEN ranges from more than 0.70% to 0.85%. In a case where a temperature of the steel material is lower than 10° C. when the steel material is subjected to the gas shield arc welding, the gas shield arc welding may be performed after the steel material is preheated such that the temperature thereof becomes 10° C. or higher; or in a case where the temperature of the steel material is 10° C. or higher when the steel material is subjected to the gas shield arc welding, the gas shield arc welding may be performed without preheating the steel material, $$CEN=[C]+(0.75+0.25 \times TAN\ H(20 \times ([C]-0.12))) \times ([Si]/24+[Mn]/6+[Cu]/15+[Ni]/20+([Cr]+[Mo]+[Nb]+[V])/5+5 \times [B]):\quad \text{Expression 4}$$

here, the element symbols with square brackets each may express, by unit mass %, the amount of the element corresponding to each of the element symbols included in the steel material.

(16) In the manufacturing method of a welded joint according to (14), the steel material may be a steel sheet of which a sheet thickness ranges from more than 20 mm to 50 mm, of which a C content ranges from 0.20% to 0.55% by unit mass %, and of which CEN calculated by using Expression 4 ranges from more than 0.70% to 0.85%. The method may further include preheating the steel material before the gas shield arc welding such that a temperature of the steel material becomes 100° C. or higher, $$CEN=[C]+(0.75+0.25 \times TAN\ H(20 \times ([C]-0.12))) \times ([Si]/24+[Mn]/6+[Cu]/15+[Ni]/20+([Cr]+[Mo]+[Nb]+[V])/5+5 \times [B])\quad \text{(Expression 3)}$$

here, the element symbols with square brackets each may express, by unit mass %, the amount of the element corresponding to each of the element symbols included in the steel material.

(17) According to another aspect of the present invention, there is provided a welded joint which is obtained by the manufacturing method of a welded joint according to any one of (14) to (16).

(18) According to another aspect of the present invention, there is provided a flux-cored wire including a steel sheath, and a flux that fills an inside of the steel sheath. An amount of diffusion hydrogen of a weld metal, which is obtained by performing direct current gas shield arc welding using the flux-cored wire under a condition regulated by JIS Z 3118, is 1.0 ml/100 g or smaller. A weight per welding time of a spatter, which has a diameter of 1.0 mm or greater and is generated when direct current gas shield arc welding is performed by using the flux-cored wire under conditions that wire polarity is positive, a current value is 270 A, a voltage value ranges from 29 to 32 V, a welding rate is 30 cm/min, a type of a shielding gas is 100% $CO_2$ gas, and a flow rate of the shielding gas is 25 L/min, is 5.0 g/min or smaller.

(19) According to another aspect of the present invention, there is provided a flux-cored wire including a steel sheath, and a flux that fills an inside of the steel sheath. The flux-cored wire has an amount of Ti oxides ranging from 0.10% to 2.50% by mass % with respect to a total mass of the flux-cored wire and includes Ni: 0% to 0.5%. An amount of diffusion hydrogen of a weld metal, which is obtained by performing direct current gas shield arc welding using the flux-cored wire under a condition regulated by JIS Z 3118, is 1.0 ml/100 g or smaller. A weight per welding time of a spatter, which has a diameter of 1.0 mm or greater and is generated when direct current gas shield arc welding is performed by using the flux-cored wire under conditions that wire polarity is positive, a current value is 270 A, a voltage value ranges from 29 to 32 V, a welding rate is 30 cm/min, a type of a shielding gas is 100% $CO_2$ gas, and a flow rate of the shielding gas is 25 L/min, is 5.0 g/min or smaller.

Effects of the Invention

In the flux-cored wire according to the present invention, high toughness is achieved, a weld having excellent cold-cracking resistance properties and hot-cracking resistance properties can be obtained, and the generation amount of spatter during welding can be drastically reduced.

In the manufacturing method of a welded joint according to the present invention, preheating work for preventing a crack of a weld metal can be omitted or the preheating temperature can be lowered, a hot crack of a weld metal can be prevented, and the generation amount of spatter can be drastically reduced.

The welded joint according to the present invention has high strength and high toughness and includes a weld having a favorable bead shape.

The flux-cored wire and the manufacturing method of a welded joint according to the present invention can be applied to any steel material. Particularly, remarkable effects are exhibited in a case of being applied to welding of a wear resistant steel, a high alloy cast steel, and the like within HB450 to HB600 class to which it is difficult for an ordinary flux-cored wire and an ordinary manufacturing method of a welded joint to be applied. Even in this case, according to the present invention, preheating work for preventing a cold crack can be omitted or the preheating temperature at the time of preheating work can be lowered, and a hot crack can be prevented from being generated. Moreover, the flux-cored wire and the manufacturing method of a welded joint according to the present invention can be combined with any shielding gas. Particularly, remarkable effects are exhibited in a case of being combined with 100% $CO_2$ gas with which it is difficult for an ordinary flux-cored wire and an ordinary manufacturing method of a welded joint to be combined. Even in this case, according to the present invention, a spatter can be prevented from being generated.

EMBODIMENTS OF THE INVENTION

First, a method of preventing generation of a cold crack in a welded joint ascertained by the inventors will be described. The factors causing a cold crack in a HAZ at the time of welding are hardness of the HAZ, a joint restraint force, and an amount of diffusion hydrogen in a weld metal. It has been known that hardness of the HAZ is determined based on hardenability of the HAZ calculated from the sheet thickness of a parent material, the C content of the HAZ, and the amounts of other alloy elements, under the same welding condition. The inventors have studied various methods for reliably preventing a cold crack in the HAZ, in a high carbon steel such as a wear resistant steel and a high alloy cast steel within HB450 to HB600 class having various sheet thicknesses, the C contents, and the amount of other alloy elements. The C content of such a high carbon steel is approximately 0.55% at the maximum, and hardness of the HAZ in a welded joint obtained by performing welding thereof is approximately Hv700 at the maximum. As a result of studies of the inventors, it has become clear that a cold crack in the HAZ can be prevented if hydrogen can be prevented from invading the HAZ by sufficiently reducing the amount of diffusion hydrogen in a weld metal, even in a case where hardness of the HAZ is remarkably high.

Figure 1:
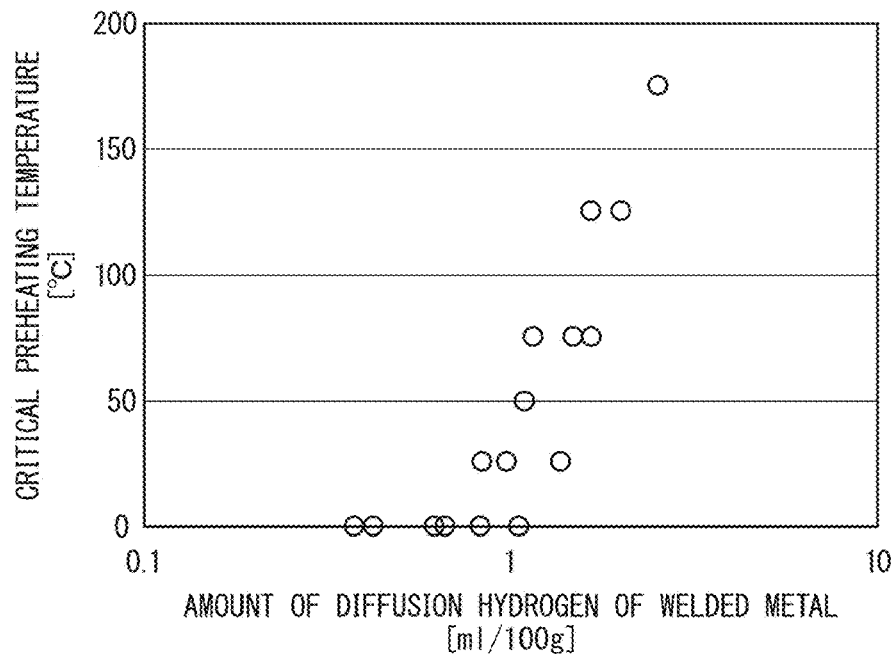
FIG. 1 is a view illustrating a relationship between an amount of diffusion hydrogen of a weld metal and a critical preheating temperature in a case where HAZ hardness ranges from Hv550 to HV700.

FIG. 1 is a view illustrating a relationship between the amount of diffusion hydrogen of a weld metal and a critical preheating temperature in a case where the HAZ hardness ranges from Hv550 to HV700. The critical preheating temperature is a lowest preheating temperature at which a cold crack is not generated in a welded joint in a case where a y-groove weld cracking test regulated by JIS Z 3158-1993 "the y-groove weld cracking test method" is performed with respect to the welded joint. For example, in a welded joint having a critical preheating temperature of 50° C., if the preheating temperature is 50° C. or higher, a cold crack is not generated in a welded joint. In a welded joint having a critical preheating temperature of 0° C., a cold crack is not generated in the welded joint even if preheating is omitted in an ordinary environment. The inventors have made a graph as illustrated in FIG. 1 by measuring critical preheating temperatures of various welded joints differing in the amounts of diffusion hydrogen of a weld metal. In the y-groove weld cracking test, the test temperature was set to 25° C., and the presence or absence of a crack was checked on surfaces and cross sections of welds. The amount of diffusion hydrogen was measured by the method of gas chromatography in conformity to JIS Z 3118-2007 "method of measurement of amount of hydrogen evolved from steel welds".

As illustrated in FIG. 1, the inventors have ascertained that if the amount of diffusion hydrogen in a weld metal immediately after welding is smaller than 1.0 ml/100 g, even if the HAZ hardness is within Hv550 to HV700, the critical preheating temperature can be set to 50° C. or lower.

However, according to the technologies in the related art, it has been difficult to reduce the amount of diffusion hydrogen in a weld metal immediately after welding to be smaller than 1.0 ml/100 g. The inventors have repeatedly studied to make the amount of diffusion hydrogen in a weld metal immediately after welding smaller than 1.0 ml/100 g, using flux-cored wires differing in type and compounding ratio of the flux component.

As a result, the inventors have ascertained that the amount of diffusion hydrogen in a weld metal immediately after welding can be stably controlled to be smaller than 1.0 ml/100 g by causing a flux to contain predetermined amounts of fluorides and oxides and causing the compounding ratio of fluorides and oxides to be within a predetermined range.

However, there are cases where fluorides included in the flux increases the amount of spatter. Particularly, in a case of performing welding with a shielding gas of 100% $CO_2$ gas by using a flux-cored wire containing fluorides, sometimes the amount of spatter extremely increases. The inventors have repeatedly studied to control the amount of spatter, using flux wires differing in type of fluorides to be included in the flux.

As a result, the inventors have found that there is a favorable correlationship between an F-equivalent value of the amount of fluorides and the amount of diffusion hydrogen in a weld metal immediately after welding, and there is a favorable correlationship between a spatter generation index Y calculated by using the following expression and the generation amount of spatter.

$$Y=[NaF]+[MgF_2]+[Na_3AlF_6]+1.50\times([K_2SiF_6]+[K_2ZrF_6]+[LiF]+[BaF_2])+3.50\times([CaF_2])$$

Figure 2:
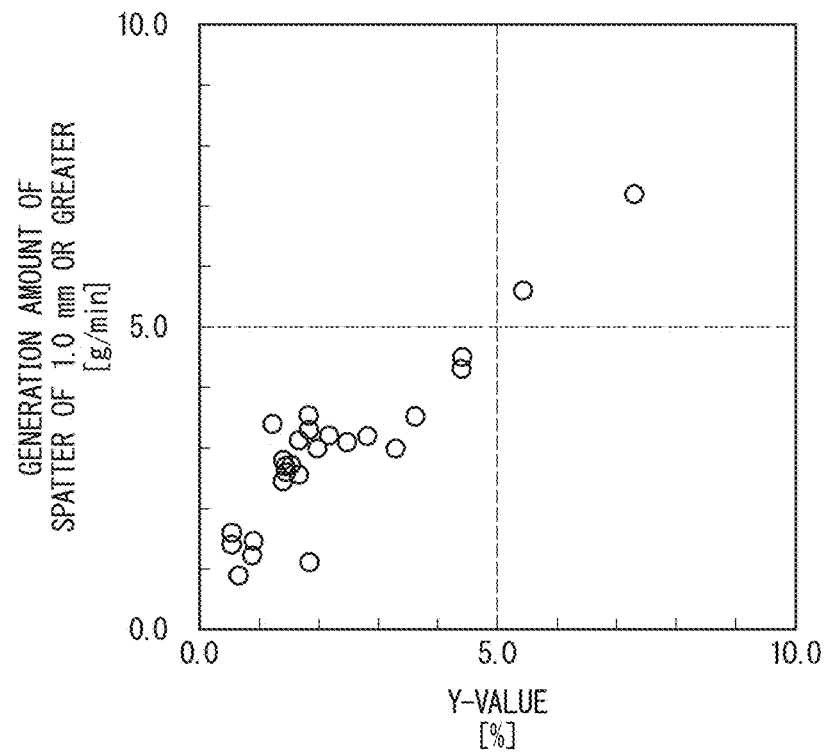
FIG. 2 is a view illustrating a relationship between a Y-value of a flux-cored wire and an amount of spatter during welding using the flux-cored wire.

In the expression described above, the bracketed chemical formulas each indicate, by mass % with respect to the total mass of the flux-cored wire, the amount of the fluoride corresponding to each of the chemical formulas. The expression described above is obtained by measuring the amount of spatter generated when the flux-cored wires differing in the amount of each fluoride is subjected to welding with a shielding gas of $CO_2$ 100%, and performing multiple regression analysis of a relationship between the amount of each fluoride and the amount of spatter. FIG. 2 is a graph illustrating a relationship between a Y-value and the amount of spatter. From this graph, it is possible to know that there is a favorable correlationship between the Y-value and the amount of spatter. Therefore, if the type and the compounding ratio of fluorides included in the flux are determined such that the F-equivalent value of fluorides included in the flux is increased as much as possible and the Y-value calculated from the fluorides included in the flux is reduced as much as possible, it is possible to provide a flux-cored wire in which the amount of diffusion hydrogen in a weld metal immediately after welding is smaller than 1.0 ml/100 g without harming workability of welding with a shielding gas of 100% $CO_2$ gas.

Next, a method of preventing generation of a hot crack in a welded joint ascertained by the inventors will be described. A hot crack of a weld metal is more likely to be generated as the C content in the weld metal increases. The weld metal includes a region in which a filler metal (that is, a flux-cored wire) and a melted material to be welded (that is, a parent material) are mixed together. Therefore, the C content of a weld metal is influenced by the C contents of both the filler material and the material to be welded.

Figure 3:
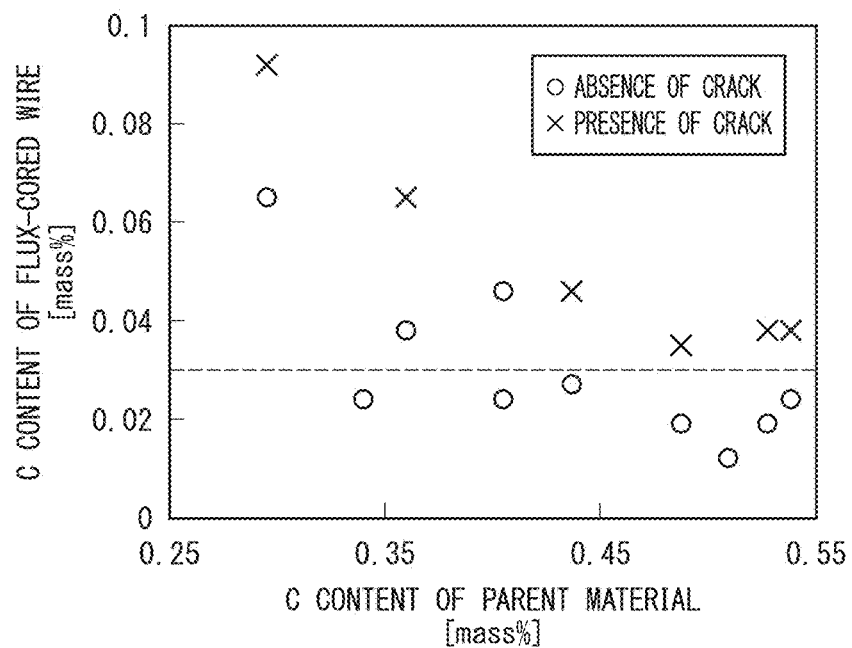
FIG. 3 is a view illustrating a relationship between a C content of a parent material and a C content of a welding material, and a hot crack.

FIG. 3 is a view illustrating a relationship between the C content of the parent material and the C content of the filler material, and a hot crack. The inventors have made a graph as illustrated in FIG. 3 by checking the presence or absence of a hot crack in various welded joints differing in the C content of the parent material and the C content of the welding material. The presence or absence of a hot crack are checked by performing a hot crack test in conformity to JIS Z 3155-1993 "FISCO test". In the hot crack test, the test temperature was set to 25° C.

As illustrated in FIG. 3, if the C content of the flux-cored wire is set to 0.030% or less, a hot crack can be prevented in a material to be welded having a C content of 0.55% or less.

The present invention has been made based on such studies. Hereinafter, the flux-cored wire of the present invention will be described separately for a flux component and an alloy component. The amount of the component in description regarding a welding wire indicates mass % with respect to the total mass of the welding wire.

The flux-cored wire according to the present embodiment includes a steel sheath and a flux that fills the inside of the steel sheath. Hereinafter, a reason for limiting the constituent element of the flux-cored wire according to the present embodiment will be described.

First, the flux component will be described. The flux of the flux-cored wire according to the present embodiment includes fluorides, and oxides excluding CaO. Preferably, the flux further includes carbonates. In addition, CaO and iron powder may be further included in the flux of the flux-cored wire according to the present embodiment. However, since CaO and iron powder are not necessary to achieve the object of the flux-cored wire according to the present embodiment, it is favorable that CaO and iron powder are not included. Particularly, as described below, if CaO comes into contact with the air, CaO changes into CaOH which is a compound including hydrogen, thereby increasing the amount of diffusion hydrogen of a weld metal. Therefore, it is preferable that the amount of CaOH is reduced as much as possible.

Hereinafter, the components will be described in detail. In description below, unless otherwise described particularly, "%" denotes "mass % with respect to the total mass of the flux-cored wire".

(Total value of F-equivalent values of fluorides with respect to total mass of flux-cored wire: 0.21% or more)

The flux of the flux-cored wire according to the present embodiment includes fluorides of 0.21% or more in total in terms of the F-equivalent value with respect to the total mass of the flux-cored wire. The F-equivalent value of fluorides with respect to the total mass of the flux-cored wire indicates, by mass % with respect to the total mass of the flux-cored wire, the amount of fluorine (F) included in fluorides in the flux. As described below, fluorides of the flux-cored wire according to the present embodiment are at least one selected from the group consisting of $CaF_2$, $MgF_2$, $Na_3AlF_6$, LiF, NaF, $K_2ZrF_6$, $BaF_2$, and $K_2SiF_6$, and the total of the F-equivalent values with respect to the total mass of the flux-cored wire is obtained in terms of the following mathematical expression.

$$\text{(Total of F-equivalent values)}=0.487\times[CaF_2]+0.610\times[MgF_2]+0.732\times[LiF]+0.452\times[NaF]+0.402\times[K_2ZrF_6]+0.217\times[BaF_2]+0.517\times[K_2SiF_6]+0.543\times[Na_3AlF_6]$$

In the expression described above, the bracketed chemical formulas each indicate, by mass % with respect to the total mass of the flux-cored wire, the amount of the fluoride corresponding to each of the chemical formulas. Hereinafter, there are cases where "the F-equivalent value with respect to the total mass of the flux-cored wire" is disclosed as "the F-equivalent value". In addition, the reference sign "a" indicates the total of the F-equivalent values of fluorides with respect to the total mass of the flux-cored wire.

The coefficient of the F-equivalent value of each of the fluorides is calculated from the number and the atomic weight of fluorine included in each fluoride, and the molecular weight of each fluoride. For example, the coefficient 0.487 of the F-equivalent value of $CaF_2$ is a value obtained by dividing the value, which is twice the atomic weight 19.00 of fluorine, by the chemical formula weight 78.08 of $CaF_2$.

The fluorides in the flux function to reduce the amount of diffusion hydrogen of a weld metal and to remarkably improve cold-cracking resistance properties of a weld metal. Although the reason thereof is not clear, it is assumed that F and hydrogen (H) in fluorides are bonded together during welding and become hydrogen fluoride (HF), and the HF is released to the outside of the weld metal. However, in a case where the total of the F-equivalent values of fluorides in the flux is less than 0.21%, the amount of diffusion hydrogen of a weld metal cannot be smaller than 1.0 ml/100 g. Therefore, cold-cracking resistance properties of the weld metal become insufficient. Therefore, the flux of the flux-cored wire according to the present embodiment is required to include fluorides of 0.21% or more in total in terms of the F-equivalent value. In order to further reduce the amount of diffusion hydrogen of a weld metal, the lower limit for the total amount of the F-equivalent value may be set to 0.35%, 0.40%, 0.45%, 0.50%, 0.60%, 0.70%, 0.80%, or 0.90%. Meanwhile, in a case of intending to give priority to reduction of the generation amount of spatter over reduction of the amount of diffusion hydrogen, the upper limit for the total amount of the F-equivalent value may be set to 2.00%, 1.70%, 1.50%, 1.30%, 1.10%, 1.00%, 0.90%, 0.80%, 0.70%, 0.60%, 0.50%, or 0.40%.

An experiment in which the inventors have obtained the above-described knowledge will be described below. The various flux wires differing in the total of the F-equivalent values as described above are subjected to direct current gas shield arc welding under the following conditions, and the amount of diffusion hydrogen of a weld metal obtained through the welding is measured by a method in conformity to JIS Z 3118: 2007 "the method of measuring a hydrogen content in a steel weld".

Wire diameter: 1.2 mm
Type of welding gas: 100% $CO_2$
Gas flow rate: 25 L/min
Welding current: 270 A
Welding rate 35 cm/min
Temperature of welding environment: 20° C.
Humidity of welding environment: 60%
Posture: downward
Polarity: wire+(positive)

Figure 4:
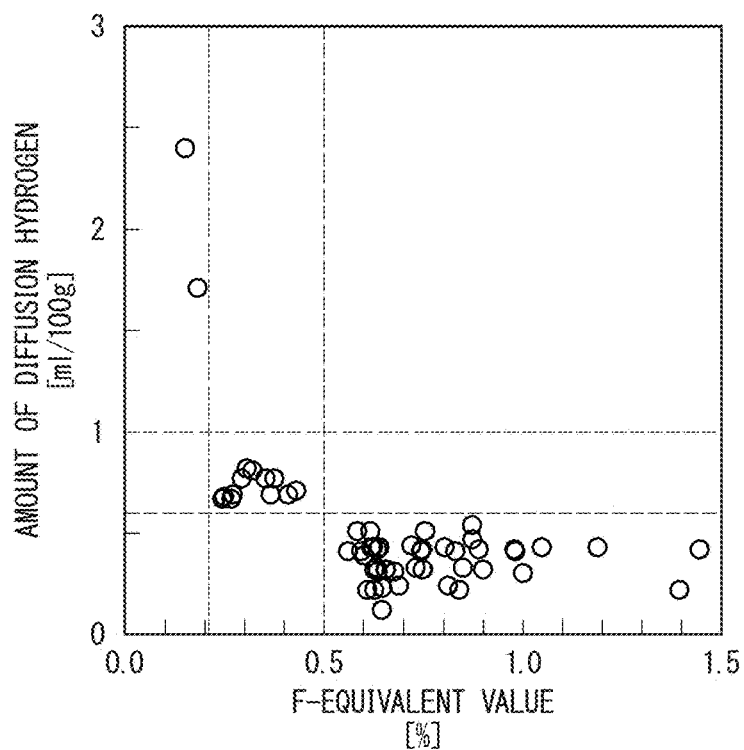
FIG. 4 is a view illustrating a relationship between an F-equivalent value of a flux-cored wire and the amount of diffusion hydrogen of a weld metal obtained by using the flux-cored wire.

The graph of FIG. 4 illustrates the relationship between the total of the F-equivalent values of the flux-cored wire and the amount of diffusion hydrogen of a weld metal obtained from the experiment described above. From this graph, it is ascertained that in a case where the total of the F-equivalent values of the flux-cored wire is 0.21% or more, the amount of diffusion hydrogen is reduced to 1.0 ml/100 g or smaller. In addition, from this graph, it is ascertained that in a case where the total of the F-equivalent values of the flux-cored wire is 0.50% or more, the amount of diffusion hydrogen is reduced to 0.6 ml/100 g or smaller.

In a case where the amount of fluorides is excessive, the amount of spatter during welding increases. However, in the flux-cored wire according to the present embodiment, there is no need to set an upper limit value for the F-equivalent value of fluorides because the inventors have found that the upper limit value for the amount of fluorides has to be restricted by using the spatter generation index Y, which will be described below. The F-equivalent value of fluorides can be selected such that the spatter generation index Y is within the range described below.

(Types of fluorides: one or at least two selected from group consisting of $CaF_2$, $MgF_2$, $Na_3AlF_6$, LiF, NaF, $K_2ZrF_6$, $BaF_2$, and $K_2SiF_6$)

Fluorides of the flux-cored wire according to the present embodiment are one or at least two selected from the group consisting of $CaF_2$, $MgF_2$, $Na_3AlF_6$, LiF, NaF, $K_2ZrF_6$, $BaF_2$, and $K_2SiF_6$. Ca, Mg, Li, Na, K, Zr, Ba, Si, and Al generated after ionization of the fluorides are bonded with oxygen and act as deoxidizing elements reducing the oxygen content in the weld metal.

(Y-value of fluorides: 5.0% or less)

In a case where the amount of fluorides is excessively large, the amount of spatter generated at the time of welding becomes excessive, so that weldability deteriorates. The inventors increased the F value as much as possible and studied the method of reducing the amount of spatter to the permissible range. As a result, the inventors have ascertained that the influence of fluorides to the amount of spatter varies depending on the type of fluorides. Then, the inventors have further studied and eventually found that there is a favorable correlationship between the spatter generation index Y (Y-value) calculated by the following expression and the amount of spatter.

$$Y=[NaF]+[MgF_2]+[Na_3AlF_6]+1.50\times([K_2SiF_6]+[K_2ZrF_6]+[LiF]+[BaF_2])+3.50\times([CaF_2])$$

In the expression described above, the bracketed chemical formulas each indicate, by mass % with respect to the total mass of the flux-cored wire, the amount of the fluoride corresponding to each of the chemical formulas. The amount of fluorides not included in the flux is regarded as 0%. The above-described expression is obtained by measuring the amount of spatter generated when the various flux-cored wires differing in the amount of fluorides are subjected to welding with a shielding gas of 100% $CO_2$, and performing multiple regression analysis of the relationship between the amount of each fluoride and the amount of spatter.

An experiment in which the inventors have obtained the above-described knowledge regarding the Y-value will be described below. The various flux wires differing in the total of the Y-values as described above are subjected to direct current gas shield arc welding under the following conditions.

Wire diameter: 1.2 mm
Type of welding gas: 100% $CO_2$ gas
Flow rate of welding gas: 25 L/min
Welding current: 270 A
Welding voltage: 29 to 32V
Welding rate: 30 cm/min
Welding posture: downward
Welding time: 60 seconds
Polarity: wire+

Welding is carried out inside a copper spatter scavenging case under the above-described conditions. Spatters generated during the welding are scavenged, and the gross weight of spatters having a diameter of 1.0 mm or greater (the generation amount of spatter of 1.0 mm or larger) among the scavenged spatters is measured.

The graph of FIG. 2 illustrates the relationship between the Y-value of the flux-cored wire and the generation amount of spatter of 1.0 mm or larger per minute obtained from the experiment described above. From this graph, it is ascertained that in a case where the Y-value of the flux-cored wire is 5.0% or less, the generation amount of spatter of 1.0 mm or larger per minute is reduced to 5.0 g/min or smaller. Based on this experimental result, the inventors have set the upper limit value for the Y-value of the flux-cored wire according to the present embodiment to 5.0%. In the flux-cored wire according to the present embodiment, there is a need to control the amount and the type of fluorides such that the Y-value satisfies the above-described conditions. A preferable upper limit value for the Y-value is 4.0%. In a case of intending to further reduce the generation amount of spatter, the upper limit value for the Y-value may be set to 3.5%, 3.0%, 2.5%, 2.0%, 1.8%, 1.6%, 1.4%, 1.2%, or 1.0%.

There is no need to limit the lower limit value for the Y-value. However, since the total of the F-equivalent values is required to be set to 0.21% or more, the minimum value of the Y-value which can satisfy the regulation on the F-equivalent value may be set as the lower limit value for the Y-value. Specifically, the Y-value is minimized in a case where the total of the F-equivalent values is the lowest value (0.21%) and fluorides consist of only $MgF_2$. In the case where only $MgF_2$ is contained as the fluorides, the minimum requirement for $MgF_2$ is 0.344% (=0.21/0.610). Therefore, there is no possibility that the lower limit value for the Y-value falls below 0.344%. Therefore, the lower limit value for the Y-value may be set to 0.344%. In a case where the amount of diffusion hydrogen is to be further reduced, the lower limit value for the Y-value may be set to 0.40%, 0.60%, 0.80%, 1.00%, 1.20%, 1.40%, 1.60%, or 1.80%.

(Amount of $CaF_2$: less than 0.50% by mass % with respect to total mass of flux-cored wire)

Figure 5:
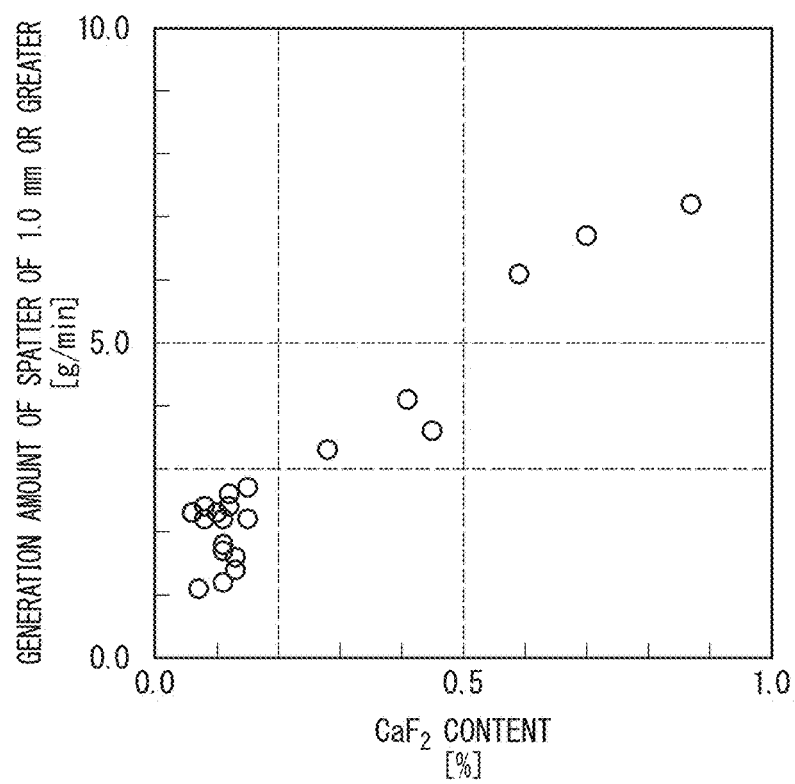
FIG. 5 is a view illustrating a relationship between a $CaF_2$ content of a flux-cored wire and the amount of spatter during welding using the flux-cored wire.

$CaF_2$ is fluoride which is likely to particularly increase the amount of spatter. The inventors have ascertained that even if the Y-value of fluoride is 5.0% or less, $CaF_2$ of 0.50% or more generates a large amount of spatters so that welding workability deteriorates. An experiment in which the inventors have obtained the above-described knowledge regarding the amount of $CaF_2$ will be described. Various flux wires differing in the amount of $CaF_2$ and having the Y-value within the regulation range described above are subjected to welding under the same conditions as those when the graph of FIG. 2 is made. Then, the generation amount of spatter of 1.0 mm or larger per minute is obtained by the same method as that when the graph of FIG. 2 is made. The graph of FIG. 5 illustrates the relationship between the amount of $CaF_2$ and the generation amount of spatter of 1.0 mm or larger per minute obtained in this experiment. From this graph, it is ascertained that in a case where the $CaF_2$ content is 0.5% or more, the generation amount of spatter of 1.0 mm or larger per minute exceeds 5.0 g/min. Meanwhile, from this graph, it is ascertained that in a case where the $CaF_2$ content is 0.2% or less, the generation amount of spatter of 1.0 mm or larger per minute becomes 3.0 g/min or smaller. Therefore, the amount of $CaF_2$ in the flux-cored wire according to the present embodiment is set to be less than 0.50%. A more preferable upper limit value for the amount of $CaF_2$ is 0.20%. As necessary, the amount of $CaF_2$ may be set to be less than 0.10%, less than 0.06%, less than 0.04%, or less than 0.02%.

As long as the above-described conditions related to the F-equivalent value and the Y-value are satisfied, there is no need to individually regulate the amounts of fluorides other than $CaF_2$. However, it is preferable that the total amount of $Na_3AlF_6$ and NaF by unit mass % with respect to the total mass of the wire is 50% or more of the total amount of fluorides by unit mass % with respect to the total mass of the wire. Hereinafter, the ratio of the total amount of $Na_3AlF_6$ and NaF by unit mass % with respect to the total mass of the wire to the total amount of fluorides by unit mass % with respect to the total mass of the wire will be referred to as the ratio of $Na_3AlF_6$+NaF.

Figure 6:
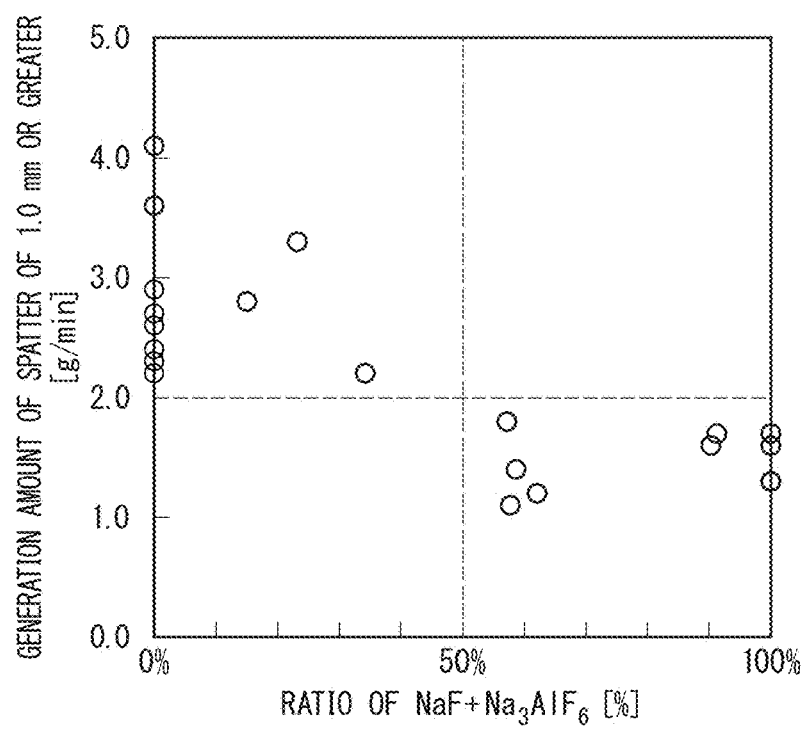
FIG. 6 is a view illustrating a relationship between a ratio of $NaF+Na_3AlF_6$ of a flux-cored wire and the amount of spatter during welding using the flux-cored wire.

An experiment in which the inventors have obtained the above-described knowledge will be described below. The inventors have obtained the generation amount of spatter of 1.0 mm or larger per minute by performing welding of various flux wires differing in the ratio of $Na_3AlF_6$+NaF under the same conditions as those when the graph of FIG. 2 is made, and by using the same method as that when the graph of FIG. 2 is made. The graph of FIG. 6 illustrates the relationship between the ratio of $Na_3AlF_6$+NaF and the generation amount of spatter of 1.0 mm or larger per minute obtained in this experiment. From this graph, it is ascertained that in a case where the ratio of $Na_3AlF_6$+NaF is 50% or more, the generation amount of spatter of 1.0 mm or larger per minute falls below 2.0 g/min. Therefore, in the flux-cored wire according to the present embodiment, it is preferable that the ratio of $Na_3AlF_6$+NaF is 50% or more. As necessary, the ratio of $Na_3AlF_6$+NaF may be set to 60% or more, 80% or more, 90% or more, or 100%. In place of the ratio of $Na_3AlF_6$+NaF, in a calculation expression of a spatter generation index X, the ratio of the total amount of $Na_3AlF_6$, NaF, and $MgF_2$ (ratio of $Na_3AlF_6$+NaF+$MgF_2$) having a coefficient of 1, by unit mass % with respect to the total mass of the wire, to the total amount of fluorides by unit mass % with respect to the total mass of the wire may be set to 50% or more, 60% or more, 80% or more, 90% or more, or 100%.

(Type of oxides: including at least one selected from group consisting of Fe oxides, Ba oxides, Na oxides, Ti oxides, Si oxides, Zr oxides, Mg oxides, Al oxides, Mn oxides, and K oxides, while excluding CaO)

(Total value β of amounts of oxides excluding CaO: 0.30% to 3.50% by mass % with respect to total mass of flux-cored wire)

(Amount of Ti oxides: 0.10% to 2.50% by mass % with respect to total mass of flux-cored wire)

The flux of the flux-cored wire according to the present embodiment includes oxides of 0.30% to 3.50% in total. The type of the oxides includes one or at least two of Fe oxides, Ba oxides, Na oxides, Ti oxides, Si oxides, Zr oxides, Mg oxides, Al oxides, Mn oxides, and K oxides, while excluding CaO. In the present embodiment, the total value of amounts of oxides excluding CaO by mass % with respect to the total mass of the flux-cored wire is defined as "β". In the present embodiment, there are cases where "oxides excluding CaO" is simply referred to as "oxides".

Oxides excluding CaO have an effect of favorably maintaining a weld bead shape. In order to achieve the effect, the lower limit value for β is required to be set to 0.30%. The lower limit value for β may be set to 0.40%, 0.50%, or 0.60%. However, in a case where β exceeds 3.50%, sometimes toughness of the weld metal is degraded. The upper limit value for β may be set to 3.00%, 2.50%, 2.00%, 1.50%, 1.25%, 1.00%, 0.90%, 0.80%, or 0.70%.

The type of oxides excluding CaO is not particularly limited. In the present embodiment, is a content in total having oxides included in a binder used for granulating the flux, in addition to the total amount of Fe oxides, Ba oxides, Na oxides, Ti oxides, Si oxides, Zr oxides, Mg oxides, Al oxides, Mn oxides, and K oxides.

Ti oxides contribute to amelioration of the weld bead shape. Even in a case where the amount of oxides ranges from 0.30% to 3.50%, in a case where Ti oxides is less than 0.10%, sometimes the weld bead shape deteriorates. Therefore, the lower limit value for the amount of Ti oxides is required to be set to 0.10%. In order to achieve a more favorable weld bead shape by using Ti oxides as an arc stabilizer, the lower limit for Ti oxides may be set to 0.15%, 0.20%, 0.25%, 0.30%, or 0.40%. Meanwhile, in a case where the amount of Ti oxides exceeds 2.50%, sometimes toughness of the weld metal is degraded. Therefore, the upper limit value for the amount of Ti oxides is required to be set to 2.50%. In order to further ameliorate toughness of the weld metal, the upper limit for Ti oxides may be set to 2.20%, 1.80%, 1.40%, 0.80%, 0.70%, 0.60%, 0.50%, 0.40%, 0.35%, or 0.30%.

(Ratio of α to β: 0.10 to 4.00)

In the flux-cored wire according to the present embodiment, in order to set the amount of diffusion hydrogen in a weld metal to be smaller than 1.0 ml/100 g, the ratio of α to β (that is, α/β) is required to be set to 0.10 to 4.00. In a case where the ratio of α to β is smaller than 0.10, since the amount of diffusion hydrogen in a weld metal cannot be set to be smaller than 1.0 ml/100 g, the lower limit value for α/β is set to 0.10. As necessary, the lower limit value for α/β may be set to 0.20, 0.30, 0.50, or 0.70. In a case where the ratio of α to β exceeds 4.00, since welding fume and slag are excessively generated, welding workability is remarkably degraded. A preferable upper limit value for the ratio of α to β is 3.80, 3.50, 3.00, 2.50, 2.00, or 1.50.

(Total value of amounts of carbonates: 0% to 3.50% by mass % with respect to total mass of flux-cored wire)

(Type of carbonates: including one or at least two selected from group consisting of $MgCO_3$, $Na_2CO_3$, $LiCO_3$, $CaCO_3$, $K_2CO_3$, $BaCO_3$, $FeCO_3$, and $MnCO_3$)

(Total amount of $MgCO_3$, $Na_2CO_3$, and $LiCO_3$: 0% to 3.00% by mass % with respect to total mass of flux-cored wire)

The flux of the flux-cored wire according to the present embodiment is not required to include carbonates. Therefore, in the flux-cored wire according to the present embodiment, the lower limit value for the amount of carbonates is 0%. However, carbonates are ionized due to arc and generate $CO_2$ gas. $CO_2$ gas lowers partial pressure of hydrogen in the welding atmosphere and causes the amount of diffusion hydrogen in a weld metal to be reduced. In order to achieve this effect, the flux of the flux-cored wire according to the present embodiment may include carbonates. A preferable lower limit value for the total value of the amount of carbonates is more than 0.30%. In order to further reduce the amount of diffusion hydrogen in a weld metal, the lower limit for the total amount of carbonates may be set to 0.50%, 0.75%, or 1.00%.

Meanwhile, in a case where the total amount of carbonates is more than 3.50%, weld beads are likely to drip, so that welding workability deteriorates. In order to prevent weld beads from dripping, the upper limit for the total amount of carbonates may be set to 3.00%, 2.50%, 2.00%, 1.50%, 1.00%, 0.50%, or 0.10%.

The type of carbonates included in the flux of the flux-cored wire according to the present embodiment includes one or at least two selected from the group consisting of $MgCO_3$, $Na_2CO_3$, $LiCO_3$, $CaCO_3$, $K_2CO_3$, $BaCO_3$, $FeCO_3$, and $MnCO_3$. However, carbonates are not limited thereto. As long as the amount of carbonates is within the range described above, the type and the composition of carbonates are not limited.

The total amount of $MgCO_3$, $Na_2CO_3$, and $LiCO_3$ included in the carbonates described above is required to range from 0% to 3.00%. Even if the total amount of carbonates ranges from 0% to 3.50%, in a case where the total amount of $MgCO_3$, $Na_2CO_3$, and $LiCO_3$ is more than 3.00%, weld beads are likely to drip, so that welding workability deteriorates. In order to prevent weld beads from dripping, the upper limit for the total amount of $MgCO_3$, $Na_2CO_3$, and $LiCO_3$ may be set to 2.70%, 2.50%, or 2.00%. Meanwhile, in order to further reduce hydrogen in the weld metal, the lower limit for the total amount of $MgCO_3$, $Na_2CO_3$, and $LiCO_3$ may be set to be more than 0.30%, 0.50%, 0.75%, or 1.00%.

(CaO: 0% to 0.20% by mass % with respect to total mass of flux-cored wire)

There are cases where CaO is included in the flux of the flux-cored wire according to the present embodiment. However, in the flux-cored wire according to the present embodiment, the amount of CaO in the flux is required to be set to 0.20% or less. Since CaO changes into CaOH which is a compound including hydrogen, diffusion hydrogen in a weld metal is increased, cold-cracking resistance properties of a weld metal are harmed. A preferable upper limit value for the amount of CaO is 0.18%, 0.10%, 0.05%, or 0.01%. Since it is preferable that CaO is not included, the lower limit value for the amount of CaO is 0%.

(Iron powder: 0% to less than 10.0% by mass % with respect to total mass of flux-cored wire)

As described above, the flux of the flux-cored wire according to the present embodiment may include iron powder. There are cases where iron powder is contained as necessary in order to adjust the filling rate of the flux in the flux-cored wire or to improve welding efficiency. However, there are cases where oxygen adhered on a surface layer of iron powder causes the oxygen content to increase in a weld metal and causes toughness to be degraded. Therefore, in the flux-cored wire according to the present embodiment, the amount of iron powder is required to be less than 10.0%. A preferable upper limit value for the amount of iron powder is 8.0%, 6.0%, 4.0%, 2.0%, or 1.0%. Since it is preferable that iron powder is not included, in the flux-cored wire according to the present embodiment, the lower limit value for the amount of iron powder is 0%. Iron powder and the Fe oxides described above are different from each other. Iron powder mainly consists of Fe which is not oxidized, and Fe oxides mainly consist of iron oxides such as red iron ore, limonite, and magnetite. Both can be distinguished by using a known component analyzer such as EPMA.

The flux according to the present embodiment may include components other than the components described above. For example, a chemical composition of a deposited metal (will be described below) and an alloy component for controlling Ceq may be contained in the flux not in a state of fluorides, oxides, or carbonates (for example, a state of metal powder or alloy powder).

Next, chemical compositions of the flux-cored wire according to the present embodiment, excluding fluorides, oxides excluding CaO, Ti oxides, CaO, carbonates, and iron powder, will be described. In description below, unless otherwise described particularly, "%" denotes "mass % with respect to the total mass of the flux-cored wire". The chemical compositions described below may be included in a steel sheath, may be included in the flux as metal powder or alloy powder as described above, or may be included in coating on the outer surface of the steel sheath. Fluorides, oxides excluding CaO, Ti oxides, CaO, and carbonates are mainly discharged to the outside of the weld metal as slag at the time of welding, and the elements included in a state of a metal or an alloy are mainly dissolved in the weld metal. In description below, there are cases where "the chemical compositions of the flux-cored wire excluding fluorides, oxides excluding CaO, CaO, carbonates, and iron powder" are simply referred to as "the chemical compositions of the flux-cored wire".

(C: 0.003% to 0.030%)

As described above, the C content of the chemical composition of the flux-cored wire according to the present embodiment is set to 0.030% or less, so that the C content of a weld metal is reduced and a hot crack of the weld metal can be prevented from being generated. Therefore, the C content in a wire is set to 0.030% or less. The upper limit for the C content may be 0.025% or less or 0.022% or less. Since it is difficult to have the C content in a wire to be less than 0.003% due to restrictions on steel making when sheath materials are manufactured, the lower limit is set thereto.

(Si: 0.10% to 1.50%)

Si is a deoxidizing element and functions to reduce the oxygen content of a weld metal, to enhance cleanliness of a weld metal, and to improve toughness of a weld metal. In order to achieve this effect, the Si content of the chemical composition of the flux-cored wire is required to be set to 0.10% or more. As necessary, the lower limit for the Si content may be set to 0.15% or 0.20%. Meanwhile, in a case where the Si content of the chemical composition of the flux-cored wire exceeds 1.50%, sometimes toughness of a weld metal deteriorates due to Si. In order to ameliorate toughness of a weld metal, the upper limit for the Si content of the chemical composition of the flux-cored wire may be set to 0.80%, 0.70%, 0.60%, or 0.50%.

(Mn: 0.50% to 3.50%)

Mn has an effect of preventing generation of a hot crack by narrowing the range of a solid-liquid coexisting temperature for a weld. In order to achieve this effect, the Mn content of the chemical composition of the flux-cored wire is required to be set to 0.50% or more. The lower limit for the Mn content of the chemical composition of the flux-cored wire may be set to 0.60%, 0.70%, 0.80%, or 0.90%. Meanwhile, in a case where the Mn content of the chemical composition of the flux-cored wire exceeds 3.50%, intergranular embrittlement sensitivity increases due to Mn, thereby leading to concern for deterioration of toughness of a weld metal. In order to ameliorate toughness of a weld metal, the upper limit for the Mn content may be limited to 2.30%, 2.10%, 1.90%, 1.70%, or 1.50%.

(Mg: 0.10% or less)

The upper limit value for the Mg content of the flux-cored wire according to the present embodiment is 0.10%, and it is preferable that the Mg content is little. The inventors have ascertained that even if there is a slight amount of Mg in the flux-cored wire, Mg increases the amount of diffusion hydrogen of a weld metal.

Figure 7:
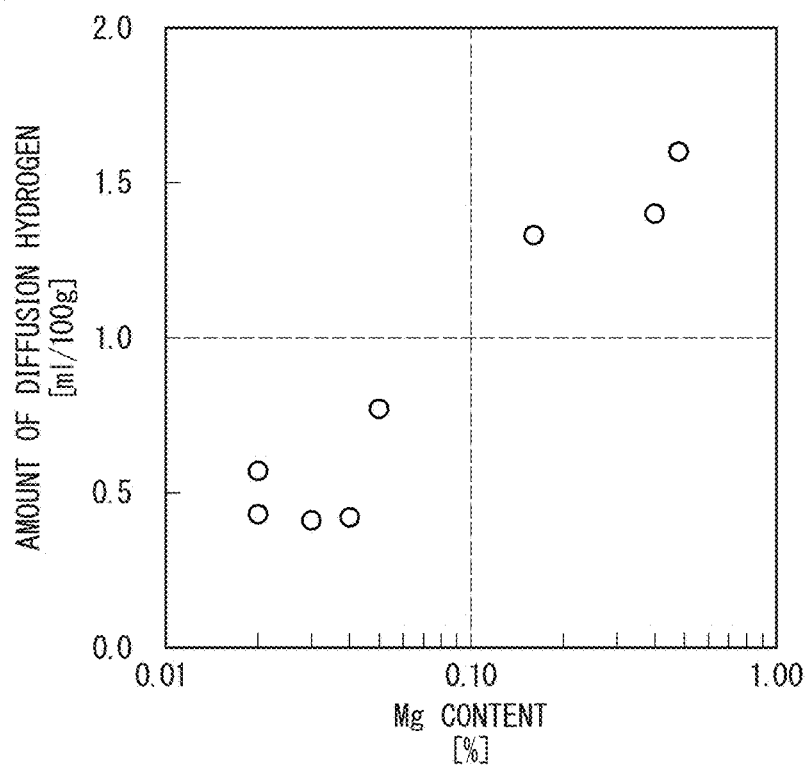
FIG. 7 is a view illustrating a relationship between a Mg content of a flux-cored wire and the amount of diffusion hydrogen of a weld metal obtained by using the flux-cored wire.

An experiment in which the inventors have obtained the above-described knowledge will be described below. Various flux wires differing in the Mg content are subjected to welding under the same conditions as those when the graph of FIG. 4 is made. Then, the amount of diffusion hydrogen of a weld metal is obtained by the same method as that when the graph of FIG. 4 is made. The graph of FIG. 7 illustrates the relationship between the Mg content of the flux-cored wire and the amount of diffusion hydrogen of a weld metal obtained from the experiment described above. From this graph, it is ascertained that in a case where the Mg content of the flux-cored wire is 0.10% or less, the amount of diffusion hydrogen of a weld metal is reduced to 1.0 ml/100 g or smaller. Based on this experimental result, the inventors have ascertained that the Mg content of the chemical composition of the flux-cored wire according to the present embodiment is required to be 0.10% or less and is preferably set to 0.07% or less. In a case where the amount of $TiO_2$ is small, the effect of increasing the amount of diffusion hydrogen due to Mg becomes remarkable.

Since Mg is not an essential component, the lower limit value for the Mg content of the chemical composition of the flux-cored wire is 0%. Meanwhile, Mg has an effect of reducing oxygen in a weld metal and improving toughness of a weld metal. Therefore, the Mg content of the chemical composition of the flux-cored wire may be set to 0.05% or more.

(P: 0.020% or less)

P is an impurity element, which enhances hot-cracking sensitivity. Therefore, the P content is required to be reduced as much as possible. In a case where the P content of the chemical composition of the flux-cored wire according to the present embodiment is 0.020% or less, bad influence of P with respect to hot-cracking sensitivity is permitted. The upper limit for the P content of the chemical composition of the flux-cored wire according to the present embodiment may be limited to 0.015%, 0.010%, 0.008%, or 0.006%.

(S: 0.020% or less)

S is an impurity element, which enhances hot-cracking sensitivity. Therefore, the S content is required to be reduced as much as possible. In a case where the S content of the chemical composition of the flux-cored wire according to the present embodiment is 0.020% or less, bad influence of S with respect to hot-cracking sensitivity is permitted. The upper limit for the S content of the chemical composition of the flux-cored wire according to the present embodiment may be limited to 0.015%, 0.010%, 0.008%, or 0.006%.

(Al: 0.001% to 0.100%)

Al is a deoxidizing element. Similar to Si, Al has an effect of reducing the oxygen content in a weld metal, enhancing cleanliness of a weld metal, and improving toughness of a weld metal. In order to achieve this effect, the Al content of the chemical composition of the flux-cored wire according to the present embodiment is set to 0.001% or more. Meanwhile, in a case where the Al content of the chemical composition of the flux-cored wire exceeds 0.100%, Al forms nitrides and oxides, so that toughness of a weld metal deteriorates. In order to ameliorate toughness of a weld metal, the upper limit for the Al content of the chemical composition of the flux-cored wire may be set to 0.090%, 0.080%, 0.070%, or 0.060%.

(Ni: 0% to 0.50%)

Since Ni is not an essential component, the lower limit value for the Ni content of the chemical composition of the flux-cored wire is 0%. Meanwhile, since Ni has an effect of improving toughness, the Ni content of the chemical composition of the flux-cored wire may be set to 0.05% or more. However, since Ni enhances hot-cracking sensitivity of a weld metal, the Ni content of the chemical composition of the flux-cored wire is required to be set to 0.50% or less. The upper limit for the Ni content of the chemical composition of the flux-cored wire may be set to 0.40% or 0.20%.

(V: 0% to 0.40%)

Since V is not an essential component, the lower limit value for the V content of the chemical composition of the flux-cored wire is 0%. Meanwhile, since V enhances hardenability of a weld metal, strength of a weld metal can be improved. In order to achieve this effect, the lower limit value for the V content of the chemical composition of the flux-cored wire may be set to 0.01%. However, in a case where the V content of the chemical composition of the flux-cored wire exceeds 0.40%, sometimes toughness of a weld metal is degraded due to V. Therefore, the upper limit value for the V content of the chemical composition of the flux-cored wire is set to 0.40%. As necessary, the upper limit value for the V content of the chemical composition of the flux-cored wire may be set to 0.30%, 0.20%, 0.10%, or 0.04%.

(Cu: 0% to 0.50%)

Since Cu is not an essential component, the lower limit value for the Cu content of the chemical composition of the flux-cored wire is 0%. Meanwhile, Cu can improve strength and toughness of a weld metal. Therefore, in order to achieve this effect, the Cu content of the chemical composition of the flux-cored wire may be set to 0.10% or more. Cu may be included in coating on the surface of the steel sheath of the flux-cored wire and may be included in the flux as a single body or an alloy. Cu coating also has an effect of improving antirust properties, conductivity, and chip wear resistance. Therefore, the Cu content of the chemical composition of the flux-cored wire is the total amount of Cu contained in the steel sheath and the flux and Cu included in the coating on a wire surface. However, if the Cu content of the chemical composition of the flux-cored wire exceeds 0.50%, sometimes toughness is degraded. Therefore, the Cu content of the chemical composition of the flux-cored wire is set to 0.50% or less. As necessary, the upper limit for the Cu content of the chemical composition of the flux-cored wire may be set to 0.40% or 0.30%.

(Cr: 0% to 1.00%)

Since Cr is not an essential component, the lower limit value for the Cr content of the chemical composition of the flux-cored wire is 0%. Meanwhile, Cr enhances hardenability of a weld metal. Therefore, in order to improve strength of a weld metal, the Cr content of the chemical composition of the flux-cored wire may be set to 0.10% or more. However, in a case where the Cr content of the chemical composition of the flux-cored wire exceeds 1.00%, sometimes toughness of a weld metal is degraded due to Cu. Therefore, the upper limit value for the Cr content of the chemical composition of the flux-cored wire is set to 1.00%. As necessary, the upper limit value for the Cr content of the chemical composition of the flux-cored wire may be set to 0.80%, 0.60%, or 0.40%.

(Mo: 0% to 1.00%)

Since Mo is not an essential component, the lower limit value for the Mo content of the chemical composition of the flux-cored wire is 0%. Meanwhile, Mo enhances hardenability of a weld metal. Therefore, in order to improve strength of a weld metal, the Mo content of the chemical composition of the flux-cored wire may be set to 0.05% or more. However, in a case where the Mo content of the chemical composition of the flux-cored wire exceeds 1.00%, sometimes toughness of a weld metal is degraded due to Mo, so that the upper limit value for the Mo content of the chemical composition of the flux-cored wire is set to 1.00%. As necessary, the upper limit value for the Mo content of the chemical composition of the flux-cored wire may be set to 0.70%, 0.60%, 0.40%, or 0.20%.

(Ti: 0% to 0.300%)

Since Ti is not an essential component, the lower limit value for the Ti content of the chemical composition of the flux-cored wire is 0%. Meanwhile, similar to Al, Ti is also a deoxidizing element and has an effect of reducing the oxygen content in a weld metal. In addition, Ti also has an effect of fixing a solute N of a weld metal and relaxing bad influence of the solute N with respect to toughness. Therefore, the Ti content of the chemical composition of the flux-cored wire may be set to 0.010% or more. However, in a case where the Ti content of the chemical composition of the flux-cored wire exceeds 0.300%, a possibility of toughness deterioration caused by coarse oxides formed therein or toughness deterioration due to excessive precipitation strengthening occurring in a weld metal increases. Therefore, the upper limit value for the Ti content of the chemical composition of the flux-cored wire is set to 0.300%. As necessary, the upper limit value for the Ti content of the chemical composition of the flux-cored wire may be set to 0.100%, 0.050%, 0.030%, or 0.020%.

(Nb: 0% to 0.100%)

Since Nb is not an essential component, the lower limit value for the Nb content of the chemical composition of the flux-cored wire is 0%. Meanwhile, Nb has an effect of improving strength of a weld metal by means of a solute. Therefore, the Nb content of the chemical composition of the flux-cored wire may be set to 0.010% or more. However, in a case where the Nb content of the chemical composition of the flux-cored wire exceeds 0.100%, Nb forms coarse precipitates in a weld metal, so that toughness of a weld metal deteriorates. Therefore, the upper limit value for the Nb content of the chemical composition of the flux-cored wire is set to 0.100%. As necessary, the upper limit value for the Nb content of the chemical composition of the flux-cored wire may be set to 0.080%, 0.050%, 0.030%, or 0.020%.

(B: 0% to 0.0100%)

Since B is not an essential component, the lower limit value for the B content of the chemical composition of the flux-cored wire is 0%. Meanwhile, B in a proper amount contained in a weld metal is bonded with the solute N and forms BN, thereby reducing bad influence of the solute N with respect to toughness. In addition, B also has an effect of enhancing hardenability of a weld metal and contributing to improvement of strength of a weld metal. Therefore, the B content of the chemical composition of the flux-cored wire may be set to 0.0010% or more. However, in a case where the B content of the chemical composition of the flux-cored wire is more than 0.0100%, the B content in a weld metal becomes excessive and forms coarse BN and a B compound such as $Fe_{23}(C, B)_6$, so that toughness of a weld metal deteriorates on the contrary. Therefore, the upper limit value for the B content of the chemical composition of the flux-cored wire is set to 0.0100%. As necessary, the upper limit value for the B content of the chemical composition of the flux-cored wire may be set to 0.0080%, 0.0060%, 0.0040%, or 0.0020%.

(Bi: 0% to 0.0100%)

Since Bi is not an essential component, the lower limit value for the Bi content of the chemical composition of the flux-cored wire is 0%. Meanwhile, Bi is an element which ameliorates exfoliation properties of slag. Therefore, the Bi content of the chemical composition of the flux-cored wire may be set to 0.0010% or more. In a case where the Bi content of the chemical composition of the flux-cored wire exceeds 0.0100%, a solidification crack is likely to be generated in a weld metal. Accordingly, the upper limit value for the Bi content of the chemical composition of the flux-cored wire is 0.0100%. The upper limit value for the Bi content of the chemical composition of the flux-cored wire is preferably 0.0080%.

(Ca: 0% to 0.50%)
(REM: 0% to 0.0100%)

Since Ca and REM are not essential components, the lower limit values for the Ca content and the REM content of the chemical composition of the flux-cored wire are 0%. Meanwhile, both Ca and REM function to change the structure of sulfides in a weld metal and to refine the size of sulfides and oxides, thereby improving ductility and toughness of a weld metal. Therefore, the Ca content of the chemical composition of the flux-cored wire may be set to 0.002% or more, and the REM content of the chemical composition of the flux-cored wire may be set to 0.0002% or more. Meanwhile, in a case where the Ca content and the REM content of the chemical composition of the flux-cored wire are excessive, sulfides and oxides are coarsened, and ductility and toughness of a weld metal deteriorate. Therefore, the upper limit value for the Ca content of the chemical composition of the flux-cored wire is 0.50%, and a preferable upper limit value is 0.40% or 0.30%. The upper limit value for the REM content of the chemical composition of the flux-cored wire is 0.0100%, and a preferable upper limit value is 0.0080% or 0.0050%.

Hereinabove, the reasons for limitation related to the amount of each of the elements included in the chemical composition of the flux-cored wire according to the present embodiment have been described. Other remainder components are Fe and impurities. The Fe component includes Fe in the steel sheath, Fe in alloy powder included in the flux, and the like. Impurities denote components which are incorporated into the steel sheath, and alloy powder and the like in the flux, and are permitted within a range not giving bad influence to the flux-cored wire according to the present embodiment.

(Ceq: 0.10 to 0.44%)

The chemical composition of the flux-cored wire according to the present embodiment is required to be controlled such that Ceq is within 0.10% to 0.44%. Ceq is an index (carbon equivalent) calculated by the following expression indicating hardenability.

$$Ceq=[C]+[Si]/24+[Mn]/6+[Ni]/40+[Cr]/5+[Mo]/4+[V]/14$$

In the expression described above, the bracketed element symbols indicate, by mass % with respect to the total mass of the flux-cored wire, the amounts of the element corresponding to each of the element symbols included in the chemical composition of the flux-cored wire excluding fluorides, oxides excluding CaO, CaO, carbonates, and iron powder. The amount of the element not included in the chemical composition of the flux-cored wire is regarded as 0%. That is, Ceq calculated from the chemical composition of the flux-cored wire of the present embodiment (Ceq of the flux-cored wire) is calculated without considering the amounts of the elements included in the flux-cored wire in a state of fluorides, oxides excluding CaO, CaO, or carbonates. Since the elements included in the flux-cored wire in a state of fluorides, oxides excluding CaO, CaO, or carbonates are discharged to the outside of a weld metal as slag at the time of welding, hardenability of a weld metal is not influenced.

Ceq of the flux-cored wire influences hardenability of a weld metal. In a case where Ceq is high, a weld metal is hardened so that tensile strength of the weld metal is improved, whereas toughness and hot-cracking resistance properties of a weld metal are degraded. In the flux-cored wire according to the present embodiment, the chemical composition excluding fluorides, oxides excluding CaO, CaO, carbonates, and iron powder is required to be controlled such that Ceq ranges from 0.10% to 0.44%. In a case where Ceq is less than 0.10%, tensile strength of a weld metal becomes insufficient. In order to enhance strength of a weld metal, the lower limit value for Ceq may be set to 0.15%, 0.20%, or 0.25%. Meanwhile, in a case where Ceq exceeds 0.44%, toughness of a weld metal and hot-cracking resistance properties become insufficient. In order to prevent deterioration of toughness and cold-cracking properties, the upper limit value for Ceq may be set to 0.42%, 0.38%, 0.36%, 0.32%, or 0.30%.

Moreover, the inventors have ascertained the reason that it is preferable for the chemical composition of the flux-cored wire according to the present embodiment to satisfy the following expression.

$$([Mg]+10\times[Al])\leq 0.45$$

[Mg] and [Al] indicate, by unit mass % with respect to the total mass of the flux-cored wire, the contents of each of Mg and Al included in the chemical composition of the flux-cored wire excluding fluorides, oxides excluding CaO, and carbonates. The inventors have ascertained that there is a relationship between the amounts of Mg and Al included in the chemical composition of the flux-cored wire, and the amount of diffusion hydrogen in a weld metal, and particularly, controlling over "[Mg]+10×[Al]" in a case of a welding atmosphere of high-temperature and high-humidity contributes to reduction of the amount of diffusion hydrogen of a weld metal. Moreover, the inventors have found that there is a favorable linear relationship, as illustrated in FIG. 8, between "[Mg]+10×[Al]" and the amount of diffusion hydrogen by performing multiple regression analysis of the amount of diffusion hydrogen of a weld metal obtained from various flux-cored wires differing in the Mg content and the Al content.

An experiment in which the inventors have obtained the above-described knowledge will be described below. The various flux wires differing in "[Mg]+10×[Al]" as described above are subjected to welding under the following conditions, and the amount of diffusion hydrogen of a weld metal obtained through the welding is measured by the same method as that when the graph of FIG. 4 is made.

Type of welding gas: 100% $CO_2$
Welding current: 270 A
Temperature of welding environment: 35° C.
Humidity of welding environment: 80%

Figure 8:
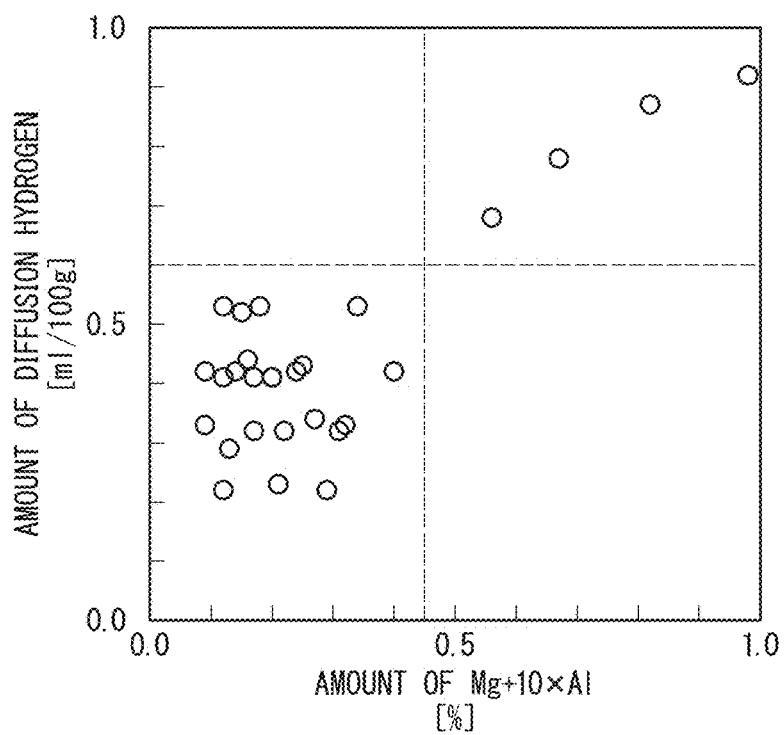
FIG. 8 is a view illustrating a relationship between "Mg+10×Al" of a flux-cored wire and an amount of diffusion hydrogen of a weld metal obtained by using the flux-cored wire.

The graph of FIG. 8 illustrates the relationship between "[Mg]+10×[Al]" and the amount of diffusion hydrogen of a weld metal obtained from the experiment described above. From this graph, it is ascertained that in a case where "[Mg]+10×[Al]" is 0.45% or less, even if the welding environment is a high-temperature high-humidity environment, the amount of diffusion hydrogen is further reduced. Based on this experimental result, the inventors have ascertained the reason that it is preferable for the chemical composition of the wire according to the present embodiment to be controlled such that "[Mg]+10×[Al]" becomes 0.45% or less, 0.40% or less and more preferably becomes 0.38% or less, or 0.35% or less. In a case where welding is performed in a high-temperature high-humidity environment, the amount of diffusion hydrogen of a weld metal is likely to increase. Accordingly, this feature exhibits a noticeable effect such as amelioration of weldability in a high-temperature high-humidity environment. However, even if "[Mg]+10×[Al]" exceeds 0.45%, as long as the Mg content and the Al content are within the numerical value ranges described above, the characteristics of the flux-cored wire according to the present embodiment are not harmed.

Subsequently, the shape of the flux-cored wire according to the present embodiment will be described.

Figure 9A:
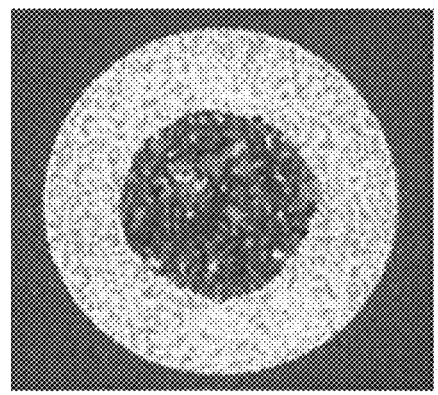
FIG. 9A is a photograph of a cut section of a wire made by performing welding in which edge surfaces abut each other.
Figure 9B:
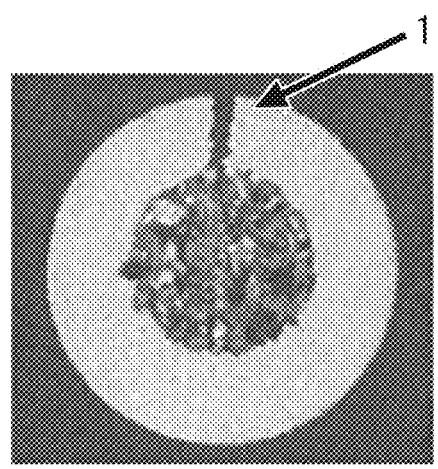
FIG. 9B is a photograph of a cut section of a wire made by causing edge surfaces to abut each other.
Figure 9C:
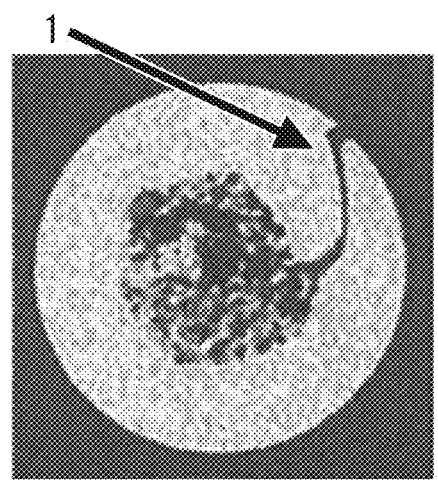
FIG. 9C is a photograph of a cut section of a wire made by causing edge surfaces to abut each other.

Generally, flux-cored wires are distinguished between wires having a shape in which a joint for a steel sheath is welded so that there is no slit-shaped gap (a seamless shape) as illustrated in FIG. 9A, and wires having a shape in which a joint for a steel sheath is not welded so that a slit-shaped gap 1 is included as illustrated in FIGS. 9B and 9C. In the flux-cored wire according to the present embodiment, any of the shapes can be employed. However, in order to prevent a cold crack of a weld metal from being generated, it is preferable that a steel sheath has no slit-shaped gap.

Hydrogen invading a weld at the time of welding is diffused in a weld metal and a material to be welded and is piled up in a stress concentration zone, thereby causing a cold crack. There are various supply sources of hydrogen. In a case where welding is performed in a state where cleanness of weld and the conditions of a gas shield are strictly managed, moisture ($H_2O$) included in a wire becomes a main supply source of hydrogen, and the amount of this moisture strongly influences diffusion hydrogen of the welded joint.

Therefore, it is desirable that the seam of a steel sheath is removed to prevent moisture in the air from invading the inside of a flux through the steel sheath before the wire is used after the wire is manufactured.

In a case where a steel sheath has a seam and has a long period of time before the wire is used after the wire is manufactured, in order to prevent a hydrogen supply source such as moisture from invading the inside of the flux-cored wire, it is desirable to take countermeasures for preventing invasion of the hydrogen sources, such as the flux-cored wire is entirely vacuum-packed, the flux-cored wire is retained inside a container such that the flux-cored wire can be held in a dry state, or a gap in the steel sheath of the flux-cored wire is filled by a method such as brazing.

The diameter of the flux-cored wire according to the present embodiment is not particularly regulated. For example, the diameter ranges from ϕ1.0 to ϕ2.0 mm. Generally, the diameter of a flux-cored wire ranges from ϕ1.2 to ϕ1.6 mm. The filling rate of the flux-cored wire according to the present embodiment is not particularly limited as long as the above-described conditions are satisfied. However, it is preferable that the lower limit value for the filling rate is set to 10% or 12%. In addition, it is preferable that the upper limit value for the filling rate is set to 20% or 17%.

The flux-cored wire according to the present embodiment may further include a lubricant which coats the wire surface. Lubricating oil coating the wire surface has an effect of improving feedability of a wire at the time of welding. Various types can be used as a lubricant for a welding wire. However, in order to prevent a cold crack of a weld metal, it is preferable to use perfluoropolyether oil (PFPE) including no hydrogen. In addition, as described above, the flux-cored wire according to the present embodiment may further include coating formed on the wire surface. In this case, the surface of coating is coated with the lubricant.

The hydrogen content included in the flux-cored wire according to the present embodiment is not particularly regulated. The reason is that the hydrogen content in the flux-cored wire fluctuates before being in use after the wire is manufactured. However, in a stage immediately after manufacturing, it is preferable that the hydrogen content is 12 ppm or less with respect to the total mass of the flux-cored wire. There is concern that the hydrogen content in the flux-cored wire may increase due to moisture invading the inside of the flux-cored wire while the flux-cored wire is retained. Therefore, in a case of a long period of time before the wire is used after the wire is manufactured, it is desirable that invasion of moisture is prevented by the way described above.

Next, a manufacturing method of the flux-cored wire according to the present embodiment will be described. The flux-cored wire according to the present embodiment can be manufactured by an ordinary manufacturing method of a flux-cored wire. Hereinafter, an example of the manufacturing method will be described.

A manufacturing method of a flux-cored wire having a seamless shape includes a step of preparing a flux, a step of obtaining a U-shaped open pipe by performing forming using a forming roll while feeding a steel strip in a longitudinal direction, a step of supplying the flux to the inside of the open pipe through an opening portion of the open pipe, a step of obtaining a seamless pipe by performing abutment welding of end portions of the open pipe, a step of obtaining a flux-cored wire with a predetermined wire diameter by performing wire drawing of the seamless pipe, and a step of annealing the flux-cored wire in the middle or after completion of the step of the wire drawing. The flux is prepared such that the amount of fluorides, the chemical composition, the oxide content excluding CaO, the CaO content, the carbonate content, and the like of the flux-cored wire are within the predetermined range as described above. It should be noted that the filling rate of the flux, which is determined based on the width and the thickness of the steel strip as a material of the steel sheath, and the filling amount of the flux, also influences the amount of fluorides of the flux-cored wire, the oxide content excluding CaO, the CaO content, the carbonate content, the chemical composition, and the like. The abutment welding is performed through electric resistance welding, laser welding, TIG welding, or the like. In addition, in the middle of the step of wire drawing or after completion of the step of wire drawing, in order to remove moisture in the flux-cored wire, the flux-cored wire is annealed. In a case where the hydrogen content of the flux-cored wire is set to 12 ppm or less, it is required that the annealing temperature is set to range from 650° C. to 900° C. and the annealing time is set to four hours or longer.

The manufacturing method of a flux-cored wire having a slit-shaped gap is the same as the manufacturing method of a flux-cored wire having a seamless shape other than the point having a step of obtaining a pipe with a slit-shaped gap by forming the open pipe and causing the end portions of the open pipe to abut each other, instead of the step of obtaining the seamless pipe by performing abutment welding of the end portions of the open pipe. The manufacturing method of a flux-cored wire having a slit-shaped gap may further include a step of caulking the abutted end portions of the open pipe. In the manufacturing method of a flux-cored wire having a slit-shaped gap, a pipe having a slit-shaped gap is subjected to wire drawing.

FIGS. 9A to 9C are photographs of a cut section of a wire. More specifically, FIG. 9A is a photograph of a cut section of a wire made by performing welding in which edge surfaces abut each other, FIG. 9B is a photograph of a cut section of a wire made by causing edge surfaces to abut each other, and FIG. 9C is a photograph of a cut section of a wire made by causing edge surfaces to abut each other. In the cut section of FIG. 9A, a welding trace is observed by polishing and etching the cut section. However, the welding trace cannot be checked without polishing and etching. Therefore, sometimes a wire having no slit-shaped gap made by causing the edge surfaces to abut each other and performing welding is referred to as a seamless wire. For example, "New Edition, Introduction of Technology of Welding and Joining" (2008) published by Japan Welding Society, Sanpo Publications Incorporated, p. 111 discloses that the flux-cored wires which are subjected to abutment seam welding and have no slit-shaped gap are regarded as seamless-type wires.

It is possible to obtain a wire having no slit-shaped gap by performing brazing after the edge surfaces abut each other as illustrated in FIG. 9B, or after the edge surfaces are caulked as illustrated in FIG. 9C. In addition, in FIGS. 9B and 9C, a wire not subjected to brazing with no change becomes a wire having a slit-shaped gap.

The flux-cored wire of the present embodiment described above can be applied to welding of steel materials of any type and is particularly suitable for being used in gas shield arc welding of a wear resistant steel, a high alloy cast steel, and the like within HB450 to HB600 class. It is possible to obtain a weld metal having the amount of diffusion hydrogen of 1.0 ml/100 g or smaller by performing welding using the flux-cored wire of the present embodiment, and a cold crack of a weld metal is prevented from being generated. Even in a case where a high carbon steel material having high cold-cracking sensitivity is subjected to arc welding, a cold crack can be prevented without preheating or at a low preheating temperature in the flux-cored wire according to the present embodiment.

Here, the amount of diffusion hydrogen of the present embodiment is the amount of diffusion hydrogen measured by the method in conformity to JIS Z 3118: 2007 "the method of measuring hydrogen content of a steel weld". In addition, Pcm (%) of a steel material indicates a value calculated by the following expression.

$$Pcm=(C)+(Si)/30+(Mn)/20+(Cu)/20+(Ni)/60+(Cr)/20+(Mo)/15+(V)/10+5\times(B$$

The parenthesized elements included in the expression above each indicate the amount (mass %) of each element included in a steel material. The amount of the element which is not contained in the steel material is regarded as 0 mass %.

Next, a manufacturing method of a welded joint according to the present embodiment will be described.

(Manufacturing method of welded joint: using flux-cored wire according to the present embodiment)

The manufacturing method of a welded joint according to the present embodiment includes a step of performing gas shield arc welding of a steel material using the flux-cored wire according to the present embodiment described above. In the manufacturing method of a welded joint according to the present embodiment, the type of the steel material (material to be welded) is not particularly limited. Since the manufacturing method of a welded joint according to the present embodiment uses the welding wire according to the present embodiment in which a cold crack can be prevented, it is possible to prevent a cold crack from being generated while preheating is omitted or the preheating temperature is lowered. In addition, since the manufacturing method of a welded joint according to the present embodiment uses the welding wire according to the present embodiment having a low C content, it is possible to prevent a hot crack from being generated. The manufacturing method of a welded joint according to the present embodiment can obtain a weld metal having favorable mechanical characteristics by using the welding wire according to the present embodiment in which Ceq and the oxygen content are preferably controlled.

However, in a case of using, as a material to be welded, a high carbon steel sheet such as a wear resistant steel and a high alloy cast steel within HB450 to HB600 class with which it is difficult to preferably perform welding in a case where an ordinary flux-cored wire is used, the welded joint according to the present embodiment can particularly exhibit dominance on the technologies in the related art. For example, a high carbon steel sheet is a steel sheet having a C content ranging from 0.20% to 0.55%. In addition, in a case of using, as a material to be welded, a high carbon steel sheet in which CEN ranges from 0.20 to 0.85% and the sheet thickness ranges from 12 mm to 100 mm, and with which it is difficult to preferably perform welding in a case where an ordinary flux-cored wire is used, the welded joint according to the present embodiment can further exhibit dominance on the technologies in the related art. CEN is an index used for estimating the preheating temperature calculated by using the following expression.

$$CEN=[C]+(0.75+0.25\times TAN\ H(20\times([C]-0.12)))\times([Si]/24+[Mn]/6+[Cu]/15+[Ni]/20+([Cr]+[Mo]+[Nb]+[V])/5+5\times[B])$$

In the expression above, the element symbols with square brackets each indicate the amount (mass %) of an element corresponding to each of the element symbols included in the steel material. The amount of the element which is not contained is regarded as zero. The expression above for calculating CEN is an expression disclosed in Collection of Welding 10. "Welding of Ferrous Material" Sanpo Publications Incorporated (1999), P. 163.

Such high carbon steel sheets are widely used in locations requiring wear resistance in equipment for civil engineering and construction work. For example, a chemical composition of a high carbon steel sheet preferable for the manufacturing method of a welded joint according to the present embodiment contains C: 0.20% to 0.55%, Si: 0.10 to 0.55%, Mn: 0.2 to 2.0%, Al: 0.01 to 0.10%, P: 0.02% or less, S: 0.015% or less, Cu: 0% to 0.5%, Cr: 0.1 to 1.2%, Mo: 0 to 0.6%, Nb: 0 to 0.05%, and B: 0 to 0.0050%, while the remainder includes iron and impurities.

In the manufacturing method of a welded joint according to the present embodiment, the welding conditions are not particularly limited and can be suitably selected in accordance with the type and the shape of a material to be welded, the welding environment, and the like.

In a preferable example of the manufacturing method of a welded joint according to the present embodiment, the above-described high carbon steel sheet is used as a parent material. The method includes a step of setting two sheets of parent material at welding positions such that a groove is formed therebetween, and a step of performing gas shield arc welding using the flux-cored welding wire according to the present embodiment and generating a weld metal between the parent materials. In the manufacturing method of a welded joint according to the present embodiment, preheating conditions for preventing a cold crack of the welded joint is not particularly limited. However, in order to improve workability, it is preferable that preheating is not performed after welding. For example, in a case where gas shield arc welding is performed in accordance with the manufacturing method of a welded joint according to the present embodiment with respect to a steel sheet of which the sheet thickness ranges from 12 to 100 mm, the C content ranges from 0.20% to 0.55% by mass %, and the CEN ranges from 0.20% to 0.70%, or a steel sheet of which the sheet thickness ranges from 12 to 20 mm, the C content ranges 0.20% to 0.55% by mass %, and the CEN ranges from more than 0.70% to 0.85%, if the temperature of the steel sheet is lower than 10° C., preheating may be performed such that the steel sheet temperature becomes 10° C. or higher, and if the temperature of the steel sheet is 10° C. or higher, preheating is not necessary. For example, in a case where gas shield arc welding is performed in accordance with the manufacturing method of a welded joint according to the present embodiment with respect to a steel sheet of which the sheet thickness ranges from more than 20 mm to 50 mm, the C content ranges from 0.20% to 0.55% by mass %, and the CEN ranges from more than 0.70% to 0.85%, preheating may be performed such that the temperature of the steel sheet becomes 100° C. or higher. Since the manufacturing method of a welded joint according to the present embodiment uses a flux-cored wire in which cold-cracking resistance properties of a weld metal can be sufficiently enhanced, even in a case where a wear resistant steel, a high alloy cast steel, and the like within HB450 to HB600 class are used as a material to be welded, it is possible to further improve welding workability by omitting preheating or lowering the preheating temperature.

The method for the gas shield arc welding is not particularly limited, and it is possible to employ a method which is generally used. The type of the shielding gas is not particularly limited. The manufacturing method of a welded joint according to the present embodiment can exhibit excellent welding workability regardless of the type of the shielding gas and can thereby obtain a welded joint having high strength and high toughness. However, it is preferable to use a carbonic acid gas by 100 vol % which is used often in general, a mixed gas of Ar and $CO_2$ ranging from 3 to 30 vol %, or the like, as the shielding gas for the manufacturing method of a welded joint according to the present embodiment. In addition, the shielding gas in welding using the flux-cored wire according to the present embodiment may include 02 gas of 5 vol % or less. Since these gases are inexpensive, it is advantageous to perform welding using these gases in terms of industrial applicability. Generally, when these gases are used in combination with a flux-cored wire including Ti oxides, a large amount of spatters are generated, so that welding workability deteriorates. However, since the manufacturing method of a welded joint according to the present embodiment uses the flux-cored wire according to the present embodiment in which the amount of spatter can be sufficiently controlled, even in a case where these gases are used as the shielding gas, it is possible to exhibit favorable welding workability. In addition, in regard to the welding conditions such as a current and a voltage, generally used conditions may be employed.

Next, the welded joint according to the present embodiment will be described.

The welded joint according to the present embodiment is obtained by the welding method according to the present embodiment described above. Since the welded joint according to the present embodiment is manufactured by using the welding wire according to the present embodiment in which Ceq, the oxygen content, and the amounts of a slag forming agent are preferably controlled, it is possible to provide a weld metal having high strength and high toughness, the amount of diffusion hydrogen 1.0 ml/100 g or smaller, and a favorable bead shape. The amount of diffusion hydrogen is measured by the method of gas chromatography in conformity to JIS Z 3118 (method of measuring hydrogen content in steel weld, 2007).

Tensile strength of a deposited metal of the welded joint according to the present embodiment (mainly, a metal formed of the flux-cored wire according to the present embodiment after melting and solidification) is approximately 490 MPa or higher. In addition, in order to prevent a hot crack, it is preferable that tensile strength of the deposited metal is set to 1,180 MPa or lower. The parent material for the welded joint according to the present embodiment is not particularly limited.

The shape of a welded joint to be manufactured is determined in accordance with the purpose and the like and is not particularly limited. The welded joint can be applied to welded joints forming a groove, such as ordinary abutment joints, corner joints, and T-joints. Therefore, the shape of a steel sheet to be welded need only have at least a sheet-shaped part for forming a welded joint, so that its entirety does not have to be sheet-shaped. For example, the steel sheet includes shaped steels. In addition, the welded joint is not limited to that constituted of separate steel sheets and may be a abutting welded joint of one sheet of steel sheet formed into a predetermined shape such as a pipe shape.

The flux-cored wire according to another aspect of the present invention includes the steel sheath, and the flux that fills the inside of the steel sheath. The amount of diffusion hydrogen of a weld metal obtained by using the flux-cored wire and performing direct current gas shield arc welding under the conditions regulated by JTS Z 3118 is 1.0 ml/100 g or smaller. The weight per welding time of a spatter, which has a diameter of 1.0 mm or greater and is generated when direct current gas shield arc welding is performed by using the flux-cored wire under the conditions in which the current value is 270 A, the voltage value ranges from 29 to 32 V, the welding rate is 30 cm/min, the type of the shielding gas is 100% $CO_2$ gas, and the flow rate of the shielding gas is 25 L/min, is 5.0 g/min or smaller. The flux-cored wire according to another aspect of the present invention includes the steel sheath, and the flux that fills the inside of the steel sheath. The flux-cored wire includes, by mass % with respect to the total mass, the amount of Ti oxides ranging from 0.10% to 2.50% and Ni ranging from 0% to 0.5%. The amount of diffusion hydrogen of a weld metal, which is obtained by using the flux-cored wire and performing direct current gas shield arc welding under the conditions regulated by JIS Z 3118, is 1.0 ml/100 g or smaller. The weight per welding time of a spatter, which has a diameter of 1.0 mm or greater and is generated when direct current gas shield arc welding is performed by using the flux-cored wire while the wire polarity is positive, the current value is 270 A, the voltage value ranges from 29 to 32 V, the welding rate is 30 cm/min, the type of the shielding gas is 100% $CO_2$ gas, and the flow rate of the shielding gas is 25 L/min, is 5.0 g/min or smaller. Since influence of the polarity of the wire to the amount of diffusion hydrogen of a weld metal and the generation amount of spatter is small to a degree which can be ignored, the polarity may be any of positive and negative. However, it is preferable that the polarity is positive. For example, in a case where direct current gas shield arc welding is performed by using the flux-cored wire according to the present embodiment under the conditions in which the wire side is positive, the posture is downward, the current value is 280 A, the voltage value is 30 V, the welding rate is 30 cm/min, the type of the shielding gas is 100% $CO_2$ gas, and the flow rate of the shielding gas is 25 L/min, the amount of diffusion hydrogen of a weld metal can be reliably set to 1.0 ml/100 g or smaller. The flux-cored wire according to the present embodiment can obtain a weld having excellent cold-cracking resistance properties, so that the generation amount of spatter during welding can be drastically reduced. Particularly, in a case where the flux-cored wire according to the present embodiment is applied to a high carbon steel such as a wear resistant steel and a high alloy cast steel within HB450 to HB600 class, preheating work for preventing a cold crack can be omitted or the preheating temperature during preheating work can be lowered, and even in a case where the shielding gas is 100% $CO_2$ gas, the generation amount of spatter can be prevented.

EXAMPLES

Next, Examples of the present invention will be described. However, the conditions in Examples are merely conditional examples employed to check feasibility and the effects of the present invention. The present invention is not limited to the conditional examples. The present invention can employ various conditions as long as the conditions do not depart from the gist of the present invention and the objects of the present invention are achieved.

The steel sheets 1 to 6 having the component (remainder of Fe and impurities) shown in Table 1 were used as materials to be welded (parent materials). In addition, in welding, a backing strip and the parent material were the same steel sheets.

TABLE 1

| BASE METAL NO. | BASE METAL STEEL SHEET COMPONENT [MASS %] | | | | | | | | | | | | | | SHEET THICKNESS [mm] | BRINELL HARDNESS | CEN [MASS %] |
|---|---|---|---|---|---|---|---|---|---|---|---|---|---|---|---|---|---|
| | C | Si | Mn | P | S | Al | Ni | V | Cu | Cr | Mo | Ti | Nb | B | | | |
| 1 | 0.271 | 0.24 | 1.05 | 0.006 | 0.002 | 0.03 | | | | 0.49 | | 0.014 | 0.01 | 0.0015 | 40 | 483 | 0.56 |
| 2 | 0.277 | 0.24 | 0.78 | 0.004 | 0.001 | 0.06 | 0.82 | | 0.21 | 0.68 | 0.37 | | 0.02 | 0.0013 | 100 | 490 | 0.69 |
| 3 | 0.265 | 0.96 | 0.58 | 0.007 | 0.002 | 0.03 | | 0.07 | | 1.03 | 0.24 | 0.012 | 0.01 | 0.0011 | 32 | 488 | 0.68 |
| 4 | 0.395 | 0.24 | 1.25 | 0.007 | 0.003 | 0.04 | | | | 0.24 | | 0.018 | | 0.0013 | 12 | 521 | 0.67 |
| 5 | 0.396 | 0.32 | 0.64 | 0.008 | 0.001 | 0.08 | | | | 0.74 | 0.41 | | | 0.0009 | 16 | 560 | 0.75 |
| 6 | 0.396 | 0.32 | 0.64 | 0.008 | 0.001 | 0.08 | | | | 0.74 | 0.41 | | | 0.0009 | 25 | 560 | 0.75 |

A steel strip was formed into an open pipe by means of a forming roll while being fed in the longitudinal direction. A flux was supplied through an opening portion of the open pipe in the middle of the forming. Edge surfaces facing each other in the opening portion were cause to abut each other. The slit-shaped gap was welded, and a pipe having no slit-shaped gap was obtained. Annealing was applied in the middle of wire drawing work for the manufactured wire. Then, flux-cored wires having a final wire diameter of ϕ1.2 mm were trial-manufactured. In addition, some were made into pipes having a slit-shaped gap, that is, the slit-shaped gap was not welded. These were subjected to wire drawing, and flux-cored wires having a wire diameter of ϕ1.2 mm were trial-manufactured. Tables 2A to 3B show the compositions of the flux components of the trial-manufactured flux-cored wires, and Tables 4 and 5 show the compositions of the metal components. However, in all the wires, the remainder was Fe and impurities. In Tables, the flux-cored wire with the note of "with gap" is a flux-cored wire in which the steel sheath includes the slit-shaped gap. In Tables, the flux-cored wire with the note of "PTFE coated" is a flux-cored wire in which the steel sheath is coated with perfluoropolyether oil.

TABLE 2A

| WIRE NO. | CLASS | FLUORIDES(F-EQUIVALENT VALUE WITH RESPECT TO TOTAL MASS OF FLUX-CORED WIRE) | | | | | | | | | Y-VALUE |
|---|---|---|---|---|---|---|---|---|---|---|---|
| | | (1) $CaF_2$ | (2) $MgF_2$ | (3) $Na_3AlF_6$ | (4) LiF | (5) NaF | (6) $K_2ZrF_6$ | (7) $BaF_2$ | (8) $K_2SiF_6$ | (1) + (2) + (3) + (4) + (5) + (6) + (7) + (8) α | |
| 1 | EXAMPLES | 1.22 | | | | | | | | 0.74 | 1.22 |
| 2 | | | 0.54 | | | | | | | 0.29 | 0.54 |
| 3 | | | | 0.37 | | 0.56 | | | | 0.27 | 0.56 |
| 4 | | | | | 0.54 | | | | | 0.24 | 0.54 |
| 5 | | | | | | 1.54 | | | | 0.62 | 2.31 |
| 6 | | | | | | | 1.23 | | | 0.27 | 1.85 |
| 7 | | | | | | | | 1.72 | | 0.89 | 2.58 |
| 8 | | | | | 1.34 | | | | | 0.98 | 2.01 |
| 9 | | 0.45 | | | | | 1.89 | | | 0.98 | 4.41 |
| 10 | | | | 0.65 | | | | | | 0.35 | 0.65 |
| 11 | | 0.11 | 0.78 | | | | 1.64 | | | 1.19 | 3.63 |
| 12 | | | | | | 0.55 | | | | 0.25 | 0.55 |
| 13 | | 0.13 | 1.21 | | | | | | | 0.72 | 1.67 |
| 14 | | | | | | | | 1.73 | | 0.38 | 2.60 |
| 15 | | 0.11 | 1.15 | | | | | | | 0.68 | 1.54 |
| 16 | | | | | | | 1.13 | | 0.27 | 0.59 | 2.10 |
| 17 | | | 1.11 | | 1.05 | | | | | 1.45 | 2.69 |
| 18 | | | | | | 1.45 | | | | 0.66 | 1.45 |
| 19 | | | | 1.38 | | | | | | 0.75 | 1.38 |
| 20 | | 0.10 | | | 0.35 | | | | | 0.30 | 0.88 |
| 21 | | 0.12 | | | | | 1.25 | | | 0.56 | 2.30 |
| 22 | | | | | | | 1.25 | 0.84 | | 0.75 | 2.51 |
| 23 | | | 0.34 | 0.18 | 0.68 | | | | | 0.80 | 1.54 |
| 24 | | 0.15 | 1.31 | | | | | | | 0.87 | 1.84 |
| 25 | | | | | | | | | 1.13 | 0.58 | 1.70 |
| 26 | | 0.08 | | | 0.79 | | | 0.33 | | 0.69 | 1.96 |
| 27 | | | | 0.74 | | 1.43 | | | | 1.05 | 2.17 |
| 28 | | | | 1.21 | | | | | | 0.66 | 1.21 |

| WIRE NO. | CLASS | OXIDE(MASS % WITH RESPECT TO TOTAL MASS OF FLUX-CORED WIRE) | | | | | | | CaO (MASS % WITH RESPECT TO TOTAL MASS OF FLUX-CORED WIRE) |
|---|---|---|---|---|---|---|---|---|---|
| | | (5) Ti OXIDES | (6) Si OXIDES | (7) Zr OXIDES | (8) Mg OXIDES | (9) Al OXIDES | (5) + (6) + (7) + (8) + (9) β | α/β | |
| 1 | EXAMPLES | 0.31 | | 0.32 | 0.22 | 0.14 | 0.99 | 0.75 | |
| 2 | | 0.18 | 0.21 | 0.21 | | | 0.60 | 0.49 | |
| 3 | | 0.25 | 0.22 | | | 0.07 | 0.54 | 0.50 | |
| 4 | | 1.21 | | 0.15 | | | 1.36 | 0.18 | |
| 5 | | 0.34 | | 0.15 | | | 0.49 | 1.26 | |

TABLE 2A-continued

| | | | | | | | | |
|---|---|---|---|---|---|---|---|---|
| 6 | 0.15 | 0.10 | | | 0.13 | 0.38 | 0.70 | |
| 7 | 0.22 | 0.23 | | 0.15 | | 0.60 | 1.48 | |
| 8 | 0.15 | 0.11 | 0.21 | 0.32 | | 0.79 | 1.24 | |
| 9 | 0.15 | 0.10 | | 0.10 | | 0.35 | 2.80 | |
| 10 | 0.21 | 0.16 | 0.22 | | 0.06 | 0.65 | 0.54 | |
| 11 | 1.05 | | | | | 1.05 | 1.13 | 0.15 |
| 12 | 0.31 | | 0.33 | | | 0.64 | 0.39 | |
| 13 | 0.13 | 0.22 | | 0.32 | | 0.67 | 1.08 | |
| 14 | 0.30 | 0.15 | 0.21 | | | 0.66 | 0.57 | |
| 15 | 0.22 | 0.23 | | | 0.12 | 0.57 | 1.19 | |
| 16 | 0.18 | | 0.14 | 0.17 | 0.21 | 0.70 | 0.85 | |
| 17 | 0.23 | 0.15 | | | | 0.38 | 3.80 | |
| 18 | 0.27 | 0.27 | | 0.13 | | 0.67 | 0.98 | |
| 19 | 0.28 | | 0.22 | | 0.25 | 0.75 | 1.00 | |
| 20 | 0.23 | | | 0.15 | | 0.38 | 0.80 | |
| 21 | 0.25 | 0.17 | | | 0.13 | 0.55 | 1.02 | |
| 22 | 2.40 | 0.80 | 0.14 | | | 3.34 | 0.22 | |
| 23 | 0.27 | 0.11 | | 0.21 | 0.32 | 0.91 | 0.88 | |
| 24 | 0.32 | 0.22 | 0.24 | | | 0.78 | 1.12 | |
| 25 | 0.14 | | 0.16 | 0.32 | | 0.62 | 0.94 | |
| 26 | 0.16 | | 0.18 | 0.16 | | 0.50 | 1.38 | |
| 27 | 0.48 | 0.12 | 0.13 | | | 0.73 | 1.44 | 0.09 |
| 28 | 0.33 | | | 0.20 | | 0.53 | 1.24 | |

TABLE 2B

| | | | CARBONATES (MASS % WITH RESPECT TO TOTAL MASS OF FLUX-CORED WIRE) | | | | | | |
|---|---|---|---|---|---|---|---|---|---|
| WIRE NO. | CLASS | IRON POWER | (10) $MgCO_3$ | (11) $Na_2CO_3$ | (12) $LiCO_3$ | (13) $CaCO_3$ | (14) $K_2CO_3$ | (15) $BaCO_3$ | (16) $FeCO_3$ |
| 1 | EXAMPLES | 1.4 | | 1.85 | | | | | |
| 2 | | 1.4 | 0.74 | | | | 0.45 | 0.12 | 0.15 |
| 3 | | | | 1.30 | 1.20 | 0.92 | | | |
| 4 | | 1.9 | | | | | | | |
| 5 | | 9.2 | | | | | | | |
| 6 | | | | 1.10 | | 0.13 | | | |
| 7 | | 1.7 | 0.64 | | | | | | 0.21 |
| 8 | | | | 1.25 | 0.23 | | | 0.32 | |
| 9 | | 3.1 | | | | | | | |
| 10 | | 1.5 | | | | | | | |
| 11 | | | | | | | | | |
| 12 | | 2.6 | | 1.42 | | 0.15 | | | |
| 13 | | | 0.38 | | 0.10 | | | 0.22 | |
| 14 | | 2.7 | | 0.98 | | | 0.11 | | |
| 15 | | 1.8 | | | | | | | |
| 16 | | 1.9 | | | | | | | |
| 17 | | 2.3 | | | | | | | |
| 18 | | 3.1 | | 0.46 | 1.15 | 0.21 | | | 0.15 |
| 19 | | 1.4 | 0.68 | 0.44 | | | | 0.31 | |
| 20 | | 3.2 | | | 0.72 | | 0.27 | | |
| 21 | | 2.3 | | | | | | | |
| 22 | | | | | | | | | |
| 23 | | 1.6 | | | | | | | |
| 24 | | | | 1.64 | | | | 0.23 | |
| 25 | | 0.9 | 0.79 | | 0.16 | 0.17 | | | |
| 26 | | 3.2 | | | | | | | |
| 27 | | | | | | | | | |
| 28 | | 1.7 | | | | | | | |

| | | CARBONATES (MASS % WITH RESPECT TO TOTAL MASS OF FLUX-CORED WIRE) | | | |
|---|---|---|---|---|---|
| WIRE NO. | CLASS | (17) $MnCO_3$ | (10) + (11) + (12) | (10) + (11) + (12) + (13) + (14) + (15) + (16) + (17) TOTAL CARBONATES | REMARKS |
| 1 | EXAMPLES | 0.10 | 1.85 | 1.95 | WITH GAP |
| 2 | | | 0.74 | 1.46 | |
| 3 | | | 2.50 | 3.42 | PFPE COATED |
| 4 | | | 0.00 | | |
| 5 | | | 0.00 | | |
| 6 | | | 1.10 | 1.23 | |
| 7 | | | 0.64 | 0.85 | |
| 8 | | 0.20 | 1.48 | 2.00 | |

TABLE 2B-continued

| | | | | |
|---|---|---|---|---|
| 9 | | 0.00 | | PFPE COATED |
| 10 | | 0.00 | | |
| 11 | | 0.00 | | WITH GAP |
| 12 | 0.13 | 1.42 | 1.70 | |
| 13 | | 0.48 | 0.70 | |
| 14 | | 0.98 | 1.09 | PFPE COATED |
| 15 | | 0.00 | | WITH GAP |
| 16 | | 0.00 | | |
| 17 | | 0.00 | | |
| 18 | | 1.61 | 1.97 | |
| 19 | | 1.12 | 1.43 | |
| 20 | | 0.72 | 0.99 | PFPE COATED |
| 21 | | 0.00 | | |
| 22 | | 0.00 | | WITH GAP |
| 23 | | 0.00 | | |
| 24 | | 1.64 | 1.87 | |
| 25 | 0.16 | 0.95 | 1.28 | |
| 26 | | 0.00 | | PFPE COATED |
| 27 | | 0.00 | | |
| 28 | | 0.00 | | WITH GAP |

TABLE 3A

| WIRE NO. | CLASS | FLUORIDES(F-EQUIVALENT VALUE WITH RESPECT TO TOTAL MASS OF FLUX-CORED WIRE) | | | | | | | | | |
|---|---|---|---|---|---|---|---|---|---|---|---|
| | | (1) $CaF_2$ | (2) $MgF_2$ | (3) $Na_3AlF_6$ | (4) LiF | (5) NaF | (6) $K_2ZrF_6$ | (7) $BaF_2$ | (8) $K_2SiF_6$ | (1) + (2) + (3) + (4) + (5) + (6) + (7) + (8) α | Y-VALUE |
| 101 | COMPARATIVE | 0.11 | 0.37 | 0.64 | | | | | | 0.63 | 1.40 |
| 102 | EXAMPLES | 0.41 | | | 0.92 | | | | | 0.87 | 2.82 |
| 103 | | 0.12 | | | | 1.20 | | | | 0.60 | 1.62 |
| 104 | | | 0.24 | | | | 1.70 | | | 0.83 | 2.79 |
| 105 | | | | | 0.77 | | | 0.33 | | 0.64 | 1.65 |
| 106 | | | | | 0.78 | | | | 0.31 | 0.73 | 1.64 |
| 107 | | 0.13 | 0.34 | 0.66 | | | | | | 0.63 | 1.45 |
| 108 | | | 0.26 | | 1.15 | | | | | 1.00 | 1.99 |
| 109 | | | 0.28 | | | 0.97 | | | | 0.61 | 1.25 |
| 110 | | | | | 0.91 | | 0.22 | | | 0.75 | 1.70 |
| 111 | | 0.08 | | | 0.68 | | | 0.45 | | 0.63 | 1.98 |
| 112 | | | | | | 0.62 | | | 0.29 | 0.43 | 1.06 |
| 113 | | 0.06 | | | 0.46 | | | | | 0.37 | 0.90 |
| 114 | | 0.28 | | 0.32 | | | 0.78 | | | 0.62 | 2.47 |
| 115 | | | 0.30 | 0.80 | | | | | | 0.62 | 1.10 |
| 116 | | 0.15 | | | 1.33 | 0.77 | | | | 1.39 | 3.29 |
| 117 | | 0.06 | | | 0.67 | | 0.30 | | | 0.64 | 1.67 |
| 118 | | | | | | 1.10 | | 0.80 | | 0.67 | 2.30 |
| 119 | | 0.11 | 0.33 | 0.72 | | | | | | 0.65 | 1.44 |
| 120 | | | 0.42 | | 0.81 | | | | | 0.85 | 1.64 |
| 121 | | | | | 0.10 | | 0.27 | | | <u>0.18</u> | 0.56 |
| 122 | | | | 3.40 | | 0.60 | | | 0.95 | 2.61 | <u>5.43</u> |
| 123 | | <u>0.87</u> | | | 0.65 | | | | | 0.90 | 4.02 |
| 124 | | | 0.30 | | | | 1.12 | | | 0.63 | 1.98 |
| 125 | | | | 0.48 | 1.10 | 1.40 | | | | 1.70 | 3.53 |
| 126 | | | | | 1.64 | | 0.85 | | | 1.54 | 3.74 |
| 127 | | | 0.32 | | 0.88 | | | | | 0.84 | 1.64 |
| 128 | | 0.12 | | | 0.64 | | 0.30 | | | 0.65 | 1.83 |
| 129 | | | 0.30 | 0.53 | | | | | 1.57 | 0.81 | 3.19 |

| WIRE NO. | CLASS | OXIDE(MASS % WITH RESPECT TO TOTAL MASS OF FLUX-CORED WIRE) | | | | | | | CaO (MASS % WITH RESPECT TO TOTAL MASS OF FLUX-CORED WIRE) |
|---|---|---|---|---|---|---|---|---|---|
| | | (5) Ti OXIDES | (6) Si OXIDES | (7) Zr OXIDES | (8) Mg OXIDES | (9) Al OXIDES | (5) + (6) + (7) + (8) + (9) β | α/β | |
| 101 | COMPARATIVE | 0.19 | | 0.13 | 0.18 | | 0.50 | 1.25 | |
| 102 | EXAMPLES | 0.18 | 0.12 | 0.08 | 0.12 | | 0.50 | 1.75 | |
| 103 | | 0.21 | 0.19 | | | 0.18 | 0.58 | 1.04 | |
| 104 | | 0.16 | | | 0.18 | | 0.34 | 2.44 | |
| 105 | | 0.22 | 0.15 | | 0.28 | | 0.65 | 0.98 | |
| 106 | | 0.25 | | 0.23 | | 0.06 | 0.54 | 1.35 | |
| 107 | | 0.12 | 0.21 | | 0.22 | | 0.55 | 1.14 | |
| 108 | | 0.34 | 0.15 | | | | 0.49 | 2.04 | |
| 109 | | 0.14 | 0.15 | 0.08 | 0.15 | | 0.52 | 1.17 | 0.08 |
| 110 | | 0.15 | 0.27 | | | | 0.42 | 1.80 | |
| 111 | | 0.21 | | 0.09 | 0.14 | | 0.44 | 1.44 | |

TABLE 3A-continued

| | | | | | | | |
|---|---|---|---|---|---|---|---|
| 112 | 0.16 | 0.15 | | | 0.15 | 0.46 | 0.94 |
| 113 | 0.28 | | | | | 0.28 | 1.31 |
| 114 | 0.32 | 0.27 | 0.11 | 0.04 | | 0.74 | 0.84 |
| 115 | 0.15 | 0.12 | | | 0.06 | 0.33 | 1.87 |
| 116 | 0.18 | 0.05 | 0.12 | 0.23 | | 0.58 | 2.40 |
| 117 | 0.32 | 0.07 | | 0.02 | | 0.41 | 1.56 |
| 118 | 0.16 | | 0.15 | 0.12 | 0.12 | 0.55 | 1.22 |
| 119 | 0.36 | 0.25 | | | | 0.61 | 1.06 |
| 120 | 0.17 | 0.15 | | 0.15 | | 0.47 | 1.81 |
| 121 | 2.40 | | 0.07 | | 0.09 | 2.56 | 0.07 |
| 122 | 0.23 | 0.07 | | 0.20 | | 0.50 | 5.22 |
| 123 | 0.18 | | | 0.22 | | 0.40 | 2.25 |
| 124 | 0.02 | 0.05 | | | | 0.07 | 9.05 |
| 125 | 2.65 | 0.05 | | 0.04 | | 2.74 | 0.62 |
| 126 | 2.40 | 0.70 | | 0.70 | | 3.80 | 0.41 |
| 127 | 0.14 | | 0.13 | | 0.02 | 0.29 | 2.89 |
| 128 | 0.22 | 0.14 | 0.12 | 0.10 | | 0.58 | 1.12 |
| 129 | 0.14 | | | 0.04 | | 0.18 | 4.51 |

TABLE 3B

| | | | CARBONATES (MASS % WITH RESPECT TO TOTAL MASS OF FLUX-CORED WIRE) | | | | | | |
|---|---|---|---|---|---|---|---|---|---|
| WIRE NO. | CLASS | IRON POWER | (10) MgCO$_3$ | (11) Na$_2$CO$_3$ | (12) LiCO$_3$ | (13) CaCO$_3$ | (14) K$_2$CO$_3$ | (15) BaCO$_3$ | (16) FeCO$_3$ |
| 101 | COMPARATIVE | 2.1 | | | | | | | |
| 102 | EXAMPLES | | | | | | | | |
| 103 | | | | | | | | | |
| 104 | | 3.3 | | | | | | | |
| 105 | | 2.0 | | | | | | | |
| 106 | | | | | | | | | |
| 107 | | | | | | | | | |
| 108 | | 2.2 | | | | | | | |
| 109 | | | | | | | | | |
| 110 | | | | | | | | | |
| 111 | | 2.6 | | | | | | | |
| 112 | | 1.8 | | | | | | | |
| 113 | | | | | | | | | |
| 114 | | | | | | | | | |
| 115 | | 2.4 | | | | | | | |
| 116 | | | | | | | | | |
| 117 | | | | | | | | | |
| 118 | | | | | | | | | |
| 119 | | 1.2 | | | | | | | |
| 120 | | | | | | | | | |
| 121 | | | | | | | | | |
| 122 | | | | | | | | | |
| 123 | | 1.2 | | | | | | | |
| 124 | | 3.9 | | | | | | | |
| 125 | | 1.2 | | | | | | | |
| 126 | | | | | | | | | |
| 127 | | | | 1.36 | 2.54 | | | | |
| 128 | | 1.4 | 1.49 | 0.75 | | 0.52 | 1.23 | | |
| 129 | | | | | | | | | |

| | | CARBONATES (MASS % WITH RESPECT TO TOTAL MASS OF FLUX-CORED WIRE) | | | |
|---|---|---|---|---|---|
| WIRE NO. | CLASS | (17) MnCO$_3$ | (10) + (11) + (12) | (10) + (11) + (12) + (13) + (14) + (15) + (16) + (17) TOTAL CARBONATES | REMARKS |
| 101 | COMPARATIVE | | 0.00 | | |
| 102 | EXAMPLES | | 0.00 | | |
| 103 | | | 0.00 | | |
| 104 | | | 0.00 | | |
| 105 | | | 0.00 | | |
| 106 | | | 0.00 | | |
| 107 | | | 0.00 | | |
| 108 | | | 0.00 | | |
| 109 | | | 0.00 | | |
| 110 | | | 0.00 | | |
| 111 | | | 0.00 | | |
| 112 | | | 0.00 | | |

TABLE 3B-continued

| | | |
|---|---|---|
| 113 | 0.00 | |
| 114 | 0.00 | |
| 115 | 0.00 | |
| 116 | 0.00 | |
| 117 | 0.00 | |
| 118 | 0.00 | |
| 119 | 0.00 | |
| 120 | 0.00 | |
| 121 | 0.00 | |
| 122 | 0.00 | |
| 123 | 0.00 | |
| 124 | 0.00 | |
| 125 | 0.00 | |
| 126 | 0.00 | |
| 127 | 3.90 | 3.90 |
| 128 | 2.24 | 3.99 |
| 129 | 0.00 | |

TABLE 4

| WIRE NO. | CLASS | CHEMICAL COMPOSITION EXCLUDING FLUORIDES, OXIDES, CAO, CARBONATES, AND IRON POWDER [MASS % WITH RESPECT TO TOTAL MASS OF FLUX-CORED WIRE] | | | | | | | | | | | |
|---|---|---|---|---|---|---|---|---|---|---|---|---|---|
| | | C | Si | Mn | P | S | Al | Ni | V | Cu | Cr | Mo | Ti |
| 1 | EXAMPLES | 0.021 | 0.42 | 0.55 | 0.013 | 0.006 | 0.014 | | | | 0.54 | 0.19 | 0.014 |
| 2 | | 0.019 | 0.52 | 1.42 | 0.011 | 0.004 | 0.021 | | | 0.32 | | 0.21 | 0.011 |
| 3 | | 0.018 | 0.49 | 1.15 | 0.010 | 0.005 | 0.013 | 0.30 | | | | 0.25 | 0.017 |
| 4 | | 0.024 | 0.33 | 0.87 | 0.012 | 0.004 | 0.032 | | 0.03 | 0.24 | 0.25 | | |
| 5 | | 0.022 | 0.32 | 2.21 | 0.009 | 0.007 | 0.012 | | | | | | 0.012 |
| 6 | | 0.016 | 0.18 | 1.21 | 0.008 | 0.004 | 0.056 | | | 0.23 | | 0.22 | 0.017 |
| 7 | | 0.020 | 0.41 | 1.20 | 0.014 | 0.003 | 0.022 | | | | | 0.25 | 0.020 |
| 8 | | 0.021 | 0.16 | 1.25 | 0.012 | 0.005 | 0.012 | | | | 0.42 | | |
| 9 | | 0.009 | 0.64 | 0.98 | 0.016 | 0.004 | 0.015 | | | | 0.32 | 0.18 | |
| 10 | | 0.018 | 0.25 | 0.76 | 0.010 | 0.005 | 0.077 | | | | | 0.62 | 0.027 |
| 11 | | 0.026 | 0.42 | 1.43 | 0.012 | 0.007 | 0.009 | 0.42 | | 0.25 | | | 0.012 |
| 12 | | 0.021 | 0.55 | 1.01 | 0.011 | 0.003 | 0.067 | | | | | 0.51 | 0.020 |
| 13 | | 0.027 | 0.48 | 1.33 | 0.015 | 0.005 | 0.029 | | | 0.27 | | 0.17 | 0.015 |
| 14 | | 0.019 | 0.39 | 1.68 | 0.008 | 0.014 | 0.018 | | | | | | 0.022 |
| 15 | | 0.021 | 0.61 | 1.41 | 0.007 | 0.006 | 0.020 | | | | | 0.23 | |
| 16 | | 0.020 | 1.42 | 1.32 | 0.011 | 0.011 | 0.012 | | | 0.32 | 0.21 | | 0.021 |
| 17 | | 0.017 | 0.64 | 1.76 | 0.006 | 0.005 | 0.024 | | | | | 0.15 | 0.012 |
| 18 | | 0.023 | 0.45 | 1.04 | 0.007 | 0.006 | 0.017 | | | 0.24 | 0.36 | | 0.032 |
| 19 | | 0.025 | 0.55 | 1.32 | 0.016 | 0.003 | 0.031 | | | | 0.20 | | |
| 20 | | 0.018 | 0.50 | 1.33 | 0.013 | 0.006 | 0.098 | | | 0.22 | | 0.23 | 0.016 |
| 21 | | 0.025 | 0.38 | 1.05 | 0.008 | 0.005 | 0.014 | | | | 0.33 | | 0.029 |
| 22 | | 0.009 | 0.10 | 3.40 | 0.013 | 0.004 | 0.005 | | | | | | 0.120 |
| 23 | | 0.019 | 0.56 | 1.24 | 0.007 | 0.011 | 0.023 | | | 0.27 | | 0.31 | |
| 24 | | 0.017 | 0.38 | 1.51 | 0.009 | 0.004 | 0.034 | 0.22 | | | 0.63 | 0.18 | 0.035 |
| 25 | | 0.020 | 0.52 | 1.01 | 0.006 | 0.005 | 0.016 | | | | 0.63 | | |
| 26 | | 0.025 | 0.41 | 1.37 | 0.014 | 0.005 | 0.027 | | | 0.41 | | 0.27 | 0.013 |
| 27 | | 0.019 | 0.54 | 1.33 | 0.012 | 0.008 | 0.018 | | | | 0.42 | | 0.032 |
| 28 | | 0.020 | 0.39 | 1.28 | 0.009 | 0.003 | 0.040 | | | | | 0.35 | 0.019 |

| WIRE NO. | CLASS | CHEMICAL COMPOSITION EXCLUDING FLUORIDES, OXIDES, CAO, CARBONATES, AND IRON POWDER [MASS % WITH RESPECT TO TOTAL MASS OF FLUX-CORED WIRE] | | | | | | | Mg + 10 × Al |
|---|---|---|---|---|---|---|---|---|---|
| | | Nb | B | Bi | Mg | Ca | REM | Ceq | |
| 1 | EXAMPLES | 0.029 | 0.0012 | | | | | 0.256 | 0.140 |
| 2 | | | 0.0032 | | | | | 0.270 | 0.210 |
| 3 | | | 0.0027 | | | | | 0.241 | 0.130 |
| 4 | | | | | | | | 0.195 | 0.320 |
| 5 | | | 0.0016 | | | | 0.0015 | 0.279 | 0.120 |
| 6 | | | 0.0015 | | | 0.38 | | 0.228 | 0.560 |
| 7 | | | 0.0023 | | | | | 0.231 | 0.220 |
| 8 | | 0.026 | | 0.0082 | | 0.29 | | 0.253 | 0.120 |
| 9 | | 0.018 | | | | | | 0.246 | 0.150 |
| 10 | | | 0.0024 | | 0.05 | | | 0.268 | 0.820 |
| 11 | | | 0.0032 | | | | | 0.239 | 0.090 |
| 12 | | | 0.0028 | | | | | 0.280 | 0.670 |

TABLE 4-continued

| | | | | | | | | |
|---|---|---|---|---|---|---|---|---|
| 13 | | 0.031 | 0.0032 | | | | 0.260 | 0.290 |
| 14 | | | 0.0020 | | 0.02 | | 0.219 | 0.200 |
| 15 | | | | | | | 0.250 | 0.200 |
| 16 | | | 0.0028 | | | 0.0032 | 0.271 | 0.120 |
| 17 | | 0.022 | 0.0015 | | | | 0.273 | 0.240 |
| 18 | | | 0.0024 | | | | 0.243 | 0.170 |
| 19 | | | | 0.27 | | | 0.225 | 0.310 |
| 20 | | | 0.0032 | | | | 0.257 | 0.980 |
| 21 | | | 0.0026 | | 0.03 | | 0.222 | 0.170 |
| 22 | | | | | 0.04 | 0.18 | 0.389 | 0.090 |
| 23 | | 0.029 | | 0.0043 | 0.02 | 0.0024 | 0.272 | 0.250 |
| 24 | | | 0.0032 | | | | 0.257 | 0.340 |
| 25 | | | | | | | 0.271 | 0.160 |
| 26 | | | 0.0015 | | | | 0.285 | 0.270 |
| 27 | | | 0.0023 | | | | 0.269 | 0.180 |
| 28 | | | 0.0032 | | | | 0.266 | 0.400 |

TABLE 5

| WIRE NO. | CLASS | CHEMICAL COMPOSITION EXCLUDING FLUORIDES, OXIDES, CAO, CARBONATES, AND IRON POWDER (MASS % WITH RESPECT TO TOTAL MASS OF FLUX-CORED WIRE) | | | | | | | | | | | |
|---|---|---|---|---|---|---|---|---|---|---|---|---|---|
| | | C | Si | Mn | P | S | Al | Ni | V | Cu | Cr | Mo | Ti |
| 101 | COMPARATIVE | <u>0.064</u> | 0.29 | 1.21 | 0.012 | 0.006 | 0.020 | | | | | | |
| 102 | EXAMPLES | 0.024 | <u>0.05</u> | 1.25 | 0.010 | 0.005 | 0.018 | | | | | | |
| 103 | | 0.021 | <u>1.61</u> | 1.22 | 0.010 | 0.006 | 0.018 | | | | | | |
| 104 | | 0.022 | 0.33 | <u>0.32</u> | 0.013 | 0.006 | 0.023 | | | | | | |
| 105 | | 0.019 | 0.30 | <u>3.64</u> | 0.009 | 0.007 | 0.022 | | | | | | |
| 106 | | 0.020 | 0.33 | 1.26 | <u>0.033</u> | 0.004 | 0.023 | | | | | | |
| 107 | | 0.020 | 0.31 | 1.24 | 0.009 | <u>0.032</u> | 0.018 | | | | | | |
| 108 | | 0.018 | 0.29 | 1.28 | 0.009 | 0.006 | <u>0.0004</u> | | | | | | |
| 109 | | 0.021 | 0.28 | 1.24 | 0.012 | 0.008 | <u>0.123</u> | | | | | | |
| 110 | | 0.021 | 0.29 | 1.24 | 0.010 | 0.006 | 0.022 | <u>0.7</u> | | | | | |
| 111 | | 0.019 | 0.30 | 1.20 | 0.013 | 0.005 | 0.018 | | <u>0.45</u> | | | | |
| 112 | | 0.020 | 0.33 | 1.26 | 0.011 | 0.005 | 0.066 | | | <u>0.79</u> | | | |
| 113 | | 0.023 | 0.32 | 1.24 | 0.012 | 0.005 | 0.079 | | | | <u>1.51</u> | | |
| 114 | | 0.020 | 0.30 | 1.25 | 0.010 | 0.005 | 0.022 | | | | | <u>1.47</u> | |
| 115 | | 0.021 | 0.30 | 1.22 | 0.009 | 0.006 | 0.018 | | | | | | <u>0.45</u> |
| 116 | | 0.019 | 0.31 | 1.24 | 0.014 | 0.005 | 0.018 | | | | | | |
| 117 | | 0.017 | 0.30 | 1.25 | 0.012 | 0.007 | 0.019 | | | | | | |
| 118 | | 0.023 | 0.33 | 1.27 | 0.011 | 0.006 | 0.020 | | | | | | |
| 119 | | 0.023 | 0.31 | 1.24 | 0.012 | 0.007 | 0.019 | | | | | | |
| 120 | | 0.021 | 0.29 | 1.23 | 0.011 | 0.006 | 0.017 | | | | | | |
| 121 | | 0.022 | 0.28 | 1.25 | 0.010 | 0.005 | 0.021 | | | | | | |
| 122 | | 0.023 | 0.29 | 1.24 | 0.009 | 0.005 | 0.020 | | | | | | |
| 123 | | 0.022 | 0.30 | 1.21 | 0.012 | 0.006 | 0.019 | | | | | | |
| 124 | | 0.021 | 0.31 | 1.26 | 0.010 | 0.005 | 0.018 | | | | | | |
| 125 | | 0.020 | 0.30 | 1.25 | 0.009 | 0.006 | 0.020 | | | | | | |
| 126 | | 0.019 | 0.29 | 1.27 | 0.010 | 0.007 | 0.022 | | | | | | |
| 127 | | 0.019 | 0.31 | 1.21 | 0.009 | 0.005 | 0.017 | | | | | | |
| 128 | | 0.022 | 0.30 | 1.24 | 0.010 | 0.005 | 0.024 | | | | | | |
| 129 | | 0.022 | 0.30 | 1.23 | 0.010 | 0.005 | 0.021 | | | | | | |

| WIRE NO. | CLASS | CHEMICAL COMPOSITION EXCLUDING FLUORIDES, OXIDES, CAO, CARBONATES, AND IRON POWDER (MASS % WITH RESPECT TO TOTAL MASS OF FLUX-CORED WIRE) | | | | | | Ceq | Mg + 10 × Al |
|---|---|---|---|---|---|---|---|---|---|
| | | Nb | B | Bi | Mg | Ca | REM | | |
| 101 | COMPARATIVE | | | | | | | 0.206 | 0.200 |
| 102 | EXAMPLES | | | | | | | 0.164 | 0.180 |
| 103 | | | | | | | | 0.197 | 0.180 |
| 104 | | | | | | | | <u>0.066</u> | 0.230 |
| 105 | | | | | | | | <u>0.431</u> | 0.220 |
| 106 | | | | | | | | 0.168 | 0.230 |
| 107 | | | | 0.0061 | | | | 0.166 | 0.180 |
| 108 | | | | | | | | 0.167 | 0.004 |
| 109 | | | | | | | | 0.166 | 1.230 |
| 110 | | | | | | | | 0.201 | 0.220 |
| 111 | | | | | | | | 0.160 | 0.180 |
| 112 | | | | | | | | 0.221 | 0.660 |
| 113 | | | | | | | | <u>0.471</u> | 0.790 |

TABLE 5-continued

| | | | | | | |
|---|---|---|---|---|---|---|
| 114 | | | | | 0.534 | 0.220 |
| 115 | | | | | 0.164 | 0.180 |
| 116 | 0.148 | | | | 0.194 | 0.180 |
| 117 | | 0.021 | | | 0.205 | 0.190 |
| 118 | | | 1.21 | | 0.172 | 1.410 |
| 119 | | | | 0.89 | 0.169 | 0.190 |
| 120 | | | | | 0.0311 0.165 | 0.170 |
| 121 | | | | | 0.168 | 0.210 |
| 122 | | | | | 0.168 | 0.200 |
| 123 | | | | | 0.164 | 0.190 |
| 124 | | | | | 0.169 | 0.180 |
| 125 | | | | | 0.166 | 0.200 |
| 126 | | | | | 0.167 | 0.220 |
| 127 | | | | | 0.161 | 0.170 |
| 128 | | | | | 0.167 | 0.240 |
| 129 | | | | | 0.166 | 0.210 |

Using the flux-cored wires, the parent material was caused to abut with a root gap of 16 mm at a groove angle of 20°. The parent material was used as the backing strip. Unless otherwise specified, welding was carried out without performing preheating. Here, as Ti oxides, Si oxides, Zr oxides, Mg oxides, and Al oxides, $TiO_2$, $SiO_2$, $ZrO_2$, MgO, and $Al_2O_3$ were used respectively.

Tables 6 and 7 show the welding conditions of the samples subjected to a Charpy impact test, a cold-cracking test, a hot-cracking test, measurement of amount of diffusion hydrogen, and welding workability evaluation. The welding conditions not shown in Tables 6 and 7 are as follows.

Current: 280 A
Voltage: 30 V
Welding rate: 30 cm/min
Heat input: 16.8 kj/cm
Posture: downward
Interpass temperature: 150° C. or lower
Gas flow rate: 25 L/min
Polarity: wire+(positive)
Current: direct current Charpy absorbed energy was measured by collecting No. 4 Charpy test pieces (V-notch of 2 mm) in conformity to JIS Z 3111 (2005) from a weld metal obtained in the welding described above, and performing the Charpy impact test at −40° C. The flux-cored wire that could make a weld metal having Charpy absorbed energy of 27 J or higher at −40° C. was accepted in regard to toughness.

The cold-cracking test was carried out in conformity to JIS Z 3158 (method for the y-groove weld cracking test, 1993) in the atmosphere disclosed in Tables 8 and 9 without performing preheating except for some thereof. The flux-cored wire that could make a welded joint having no crack on a surface and a cross section was accepted in regard to cold-cracking resistance properties.

The hot-cracking test was carried out in conformity to JIS Z 3155 (FISCO test, 1993) in the atmosphere disclosed in Tables 8 and 9 at the steel sheet temperature ranging from 10° C. to 100° C. After cooling, the weld was bent and was caused to fracture in the longitudinal direction, and the presence or absence of a crack was examined in regard to the fracture surface. The flux-cored wire that could make a welded joint in which generation of a crack was not recognized was accepted in regard to hot-cracking resistance properties.

The test of measuring the amount of diffusion hydrogen was carried out by the method of gas chromatography in conformity to JIS Z 3118 (method of measuring hydrogen content of a steel weld, 2007). The flux-cored wire that could make a weld metal in which the amount of diffusion hydrogen is 1.0 ml/100 g or smaller was accepted in regard to the amount of diffusion hydrogen.

The welding conditions for the samples subjected to evaluation of the amount of welding spatter and welding workability evaluation are as follows.

Wire diameter: 1.2 mm
Type of welding gas: 100% $CO_2$ gas (type of welding gas in Examples 29 and 30: Ar+$CO_2$ gas of 20%)
Flow rate of welding gas: 25 L/min
Welding current: 270 A
Welding voltage: 29 to 32 V
Welding rate: 30 cm/min
Welding posture: downward
Welding time: 60 seconds Welding was carried out inside a copper spatter scavenging case under the above-described conditions. Spatters generated during the welding were scavenged, and the gross weight of spatters having a diameter of 1.0 mm or greater (the amount of spatter of 1.0 mm or larger) among the scavenged spatters was measured. The flux-cored wire in which the amount of spatter of 1.0 mm or larger per minute became 2.5 g/min or smaller was accepted in regard to spatter characteristics. In addition, the flux-cored wire which generated a remarkable amount of fume or slag at the time of welding was determined to be poor in regard to welding workability. The flux-cored wire which had a small generation amount in both fume and slag was determined to be favorable in regard to welding workability.

TABLE 6

| | | | | WELDING CONDITIONS | | |
|---|---|---|---|---|---|---|
| SAMPLE NO. | CLASS | WIRE NO. | BASE METAL NO. | ATMOSPHERE TEMPERATURE [° C.] | ATMOSPHERE HUMIDITY [%] | TYPE OF SHIELDING GAS |
| 1 | EXAMPLES | 1 | 1 | 10 | 60 | 100% $CO_2$ |
| 2 | | 2 | 1 | 12 | 62 | 100% $CO_2$ |

TABLE 6-continued

| SAMPLE NO. | CLASS | WIRE NO. | BASE METAL NO. | WELDING CONDITIONS ATMOSPHERE TEMPERATURE [° C.] | ATMOSPHERE HUMIDITY [%] | TYPE OF SHIELDING GAS |
|---|---|---|---|---|---|---|
| 3 | | 3 | 1 | 12 | 63 | 100% $CO_2$ |
| 4 | | 4 | 1 | 11 | 60 | 100% $CO_2$ |
| 5 | | 5 | 1 | 11 | 60 | 100% $CO_2$ |
| 6 | | 6 | 2 | 10 | 61 | 100% $CO_2$ |
| 7 | | 7 | 2 | 10 | 60 | 100% $CO_2$ |
| 8 | | 8 | 2 | 11 | 62 | 100% $CO_2$ |
| 9 | | 9 | 2 | 12 | 60 | 100% $CO_2$ |
| 10 | | 10 | 2 | 10 | 60 | 100% $CO_2$ |
| 11 | | 11 | 2 | 12 | 60 | 100% $CO_2$ |
| 12 | | 12 | 3 | 11 | 60 | 100% $CO_2$ |
| 13 | | 13 | 3 | 10 | 61 | 100% $CO_2$ |
| 14 | | 14 | 3 | 13 | 60 | 100% $CO_2$ |
| 15 | | 15 | 3 | 11 | 61 | 100% $CO_2$ |
| 16 | | 16 | 3 | 10 | 62 | 100% $CO_2$ |
| 17 | | 17 | 3 | 11 | 62 | 100% $CO_2$ |
| 18 | | 18 | 4 | 10 | 60 | 100% $CO_2$ |
| 19 | | 19 | 4 | 12 | 62 | 100% $CO_2$ |
| 20 | | 20 | 4 | 11 | 60 | 100% $CO_2$ |
| 21 | | 21 | 4 | 10 | 62 | 100% $CO_2$ |
| 22 | | 22 | 4 | 10 | 60 | 100% $CO_2$ |
| 23 | | 23 | 4 | 11 | 61 | 100% $CO_2$ |
| 24 | | 24 | 5 | 10 | 60 | 100% $CO_2$ |
| 25 | | 25 | 5 | 12 | 61 | 100% $CO_2$ |
| 26 | | 26 | 5 | 12 | 60 | 100% $CO_2$ |
| 27 | | 27 | 5 | 13 | 61 | 100% $CO_2$ |
| 28 | | 28 | 5 | 10 | 60 | 100% $CO_2$ |
| 29 | | 1 | 3 | 7 | 59 | Ar + 20% $CO_2$ |
| 30 | | 7 | 4 | 4 | 58 | Ar + 20% |
| 31 | | 25 | 6 | 10 (PREHEATING 100° C.) | 60 | 100% $CO_2$ |

TABLE 7

| SAMPLE NO. | CLASS | WIRE NO. | BASE METAL NO. | WELDING CONDITIONS ATMOSPHERE TEMPERATURE [° C.] | ATMOSPHERE HUMIDITY [%] | TYPE OF SHIELDING GAS |
|---|---|---|---|---|---|---|
| 101 | COMPARATIVE | 101 | 1 | 11 | 62 | 100% $CO_2$ |
| 102 | EXAMPLES | 102 | 1 | 12 | 60 | 100% $CO_2$ |
| 103 | | 103 | 1 | 11 | 61 | 100% $CO_2$ |
| 104 | | 104 | 1 | 11 | 60 | 100% $CO_2$ |
| 105 | | 105 | 1 | 10 | 63 | 100% $CO_2$ |
| 106 | | 106 | 1 | 11 | 60 | 100% $CO_2$ |
| 107 | | 107 | 1 | 10 | 62 | 100% $CO_2$ |
| 108 | | 108 | 1 | 11 | 61 | 100% $CO_2$ |
| 109 | | 109 | 1 | 11 | 60 | 100% $CO_2$ |
| 110 | | 110 | 1 | 12 | 60 | 100% $CO_2$ |
| 111 | | 111 | 1 | 13 | 62 | 100% $CO_2$ |
| 112 | | 112 | 1 | 11 | 61 | 100% $CO_2$ |
| 113 | | 113 | 1 | 10 | 61 | 100% $CO_2$ |
| 114 | | 114 | 1 | 12 | 60 | 100% $CO_2$ |
| 115 | | 115 | 1 | 10 | 62 | 100% $CO_2$ |
| 116 | | 116 | 1 | 11 | 60 | 100% $CO_2$ |
| 117 | | 117 | 1 | 11 | 61 | 100% $CO_2$ |
| 118 | | 118 | 1 | 10 | 61 | 100% $CO_2$ |
| 119 | | 119 | 1 | 12 | 62 | 100% $CO_2$ |
| 120 | | 120 | 1 | 10 | 61 | 100% $CO_2$ |
| 121 | | 121 | 1 | 10 | 60 | 100% $CO_2$ |
| 122 | | 122 | 1 | 11 | 60 | 100% $CO_2$ |
| 123 | | 123 | 1 | 10 | 63 | 100% $CO_2$ |
| 124 | | 124 | 1 | 11 | 61 | 100% $CO_2$ |
| 125 | | 125 | 1 | 10 | 60 | 100% $CO_2$ |
| 126 | | 126 | 1 | 12 | 62 | 100% $CO_2$ |
| 127 | | 127 | 1 | 10 | 60 | 100% $CO_2$ |
| 128 | | 128 | 1 | 10 | 60 | 100% $CO_2$ |
| 129 | | 129 | 1 | 11 | 61 | 100% $CO_2$ |

Tables 8 and 9 show the result of the Charpy absorbed energy test performed at −40° C., the result of the cold-cracking test, the result of the hot-cracking test, the measurement result of the amount of diffusion hydrogen, the measurement result of the amount of welding spatter, and the evaluation result of welding workability.

TABLE 8

| SAMPLE NO. | CLASS | CHARPY ABSORBED ENERGY OF WELD METAL AT −40° C. [J] | COLD-CRACK TEST JIS Z 3158 ATMOSPHERE TEMPERATURE [° C.] | COLD-CRACK TEST JIS Z 3158 ATMOSPHERE HUMIDITY [%] | COLD-CRACK TEST JIS Z 3158 TEST RESULT | HOT-CRACK TEST JIS Z 3155 ATMOSPHERE TEMPERATURE [° C.] | HOT-CRACK TEST JIS Z 3155 ATMOSPHERE HUMIDITY [%] | HOT-CRACK TEST JIS Z 3155 TEST RESULT | AMOUNT OF DIFFUSION HYDROGEN [ml/100 g] | AMOUNT OF WELDING SPATTER | WELDING WORKABILITY |
|---|---|---|---|---|---|---|---|---|---|---|---|
| 1 | EXAMPLES | 75 | 10 | 60% | NO CRACK | 10 | 60% | NO CRACK | 0.4 | ACCEPTED | FAVORABLE |
| 2 | | 84 | 10 | 60% | NO CRACK | 10 | 61% | NO CRACK | 0.8 | ACCEPTED | FAVORABLE |
| 3 | | 88 | 11 | 62% | NO CRACK | 10 | 60% | NO CRACK | 0.7 | ACCEPTED | FAVORABLE |
| 4 | | 74 | 12 | 60% | NO CRACK | 12 | 62% | NO CRACK | 0.7 | ACCEPTED | FAVORABLE |
| 5 | | 84 | 12 | 62% | NO CRACK | 11 | 61% | NO CRACK | 0.4 | ACCEPTED | FAVORABLE |
| 6 | | 91 | 10 | 60% | NO CRACK | 10 | 62% | NO CRACK | 0.7 | ACCEPTED | FAVORABLE |
| 7 | | 88 | 10 | 61% | NO CRACK | 10 | 61% | NO CRACK | 0.4 | ACCEPTED | FAVORABLE |
| 8 | | 99 | 10 | 60% | NO CRACK | 10 | 61% | NO CRACK | 0.4 | ACCEPTED | FAVORABLE |
| 9 | | 75 | 10 | 60% | NO CRACK | 11 | 62% | NO CRACK | 0.4 | ACCEPTED | FAVORABLE |
| 10 | | 67 | 10 | 60% | NO CRACK | 10 | 63% | NO CRACK | 0.8 | ACCEPTED | FAVORABLE |
| 11 | | 79 | 11 | 62% | NO CRACK | 11 | 60% | NO CRACK | 0.4 | ACCEPTED | FAVORABLE |
| 12 | | 81 | 11 | 63% | NO CRACK | 11 | 61% | NO CRACK | 0.7 | ACCEPTED | FAVORABLE |
| 13 | | 76 | 10 | 62% | NO CRACK | 10 | 60% | NO CRACK | 0.4 | ACCEPTED | FAVORABLE |
| 14 | | 67 | 10 | 60% | NO CRACK | 10 | 62% | NO CRACK | 0.6 | ACCEPTED | FAVORABLE |
| 15 | | 57 | 10 | 60% | NO CRACK | 10 | 62% | NO CRACK | 0.3 | ACCEPTED | FAVORABLE |
| 16 | | 72 | 11 | 62% | NO CRACK | 11 | 60% | NO CRACK | 0.4 | ACCEPTED | FAVORABLE |
| 17 | | 66 | 10 | 60% | NO CRACK | 10 | 62% | NO CRACK | 0.4 | ACCEPTED | FAVORABLE |
| 18 | | 65 | 10 | 62% | NO CRACK | 10 | 63% | NO CRACK | 0.3 | ACCEPTED | FAVORABLE |
| 19 | | 60 | 10 | 60% | NO CRACK | 10 | 60% | NO CRACK | 0.3 | ACCEPTED | FAVORABLE |
| 20 | | 74 | 11 | 61% | NO CRACK | 11 | 61% | NO CRACK | 0.8 | ACCEPTED | FAVORABLE |
| 21 | | 88 | 10 | 62% | NO CRACK | 10 | 60% | NO CRACK | 0.4 | ACCEPTED | FAVORABLE |
| 22 | | 83 | 10 | 60% | NO CRACK | 10 | 61% | NO CRACK | 0.4 | ACCEPTED | FAVORABLE |
| 23 | | 74 | 10 | 60% | NO CRACK | 10 | 62% | NO CRACK | 0.4 | ACCEPTED | FAVORABLE |
| 24 | | 69 | 10 | 62% | NO CRACK | 10 | 63% | NO CRACK | 0.5 | ACCEPTED | FAVORABLE |
| 25 | | 70 | 10 | 63% | NO CRACK | 10 | 62% | NO CRACK | 0.5 | ACCEPTED | FAVORABLE |
| 26 | | 54 | 11 | 62% | NO CRACK | 11 | 61% | NO CRACK | 0.2 | ACCEPTED | FAVORABLE |
| 27 | | 59 | 10 | 60% | NO CRACK | 10 | 62% | NO CRACK | 0.4 | ACCEPTED | FAVORABLE |
| 28 | | 58 | 10 | 61% | NO CRACK | 10 | 60% | NO CRACK | 0.3 | ACCEPTED | FAVORABLE |
| 29 | | 59 | 13 | 63% | NO CRACK | 13 | 63% | NO CRACK | 0.8 | ACCEPTED | FAVORABLE |
| 30 | | 52 | 12 | 61% | NO CRACK | 12 | 60% | NO CRACK | 0.9 | ACCEPTED | FAVORABLE |
| 31 | | 67 | 10 (PREHEATING 100° C.) | 62% | NO CRACK | 10 | 63% | NO CRACK | 0.5 | ACCEPTED | FAVORABLE |

TABLE 9

| SAMPLE NO. | CLASS | CHARPY ABSORBED ENERGY OF WELD METAL AT −40° C. [J] | COLD-CRACK TEST JIS Z 3158 ATMOSPHERE TEMPERATURE [° C.] | COLD-CRACK TEST JIS Z 3158 ATMOSPHERE HUMIDITY [%] | COLD-CRACK TEST JIS Z 3158 TEST RESULT | HOT-CRACK TEST JIS Z 3155 ATMOSPHERE TEMPERATURE [° C.] | HOT-CRACK TEST JIS Z 3155 ATMOSPHERE HUMIDITY [%] | HOT-CRACK TEST JIS Z 3155 TEST RESULT | AMOUNT OF DIFFUSION HYDROGEN [ml/100 g] | AMOUNT OF WELDING SPATTER | WELDING WORKABILITY |
|---|---|---|---|---|---|---|---|---|---|---|---|
| 101 | COMPARATIVE EXAMPLES | 14 | 10 | 60% | NO CRACK | 10 | 62% | WITH CRACK | 0.3 | ACCEPTED | FAVORABLE |
| 102 | | 17 | 10 | 62% | NO CRACK | 11 | 60% | NO CRACK | 0.5 | ACCEPTED | FAVORABLE |
| 103 | | 21 | 11 | 60% | NO CRACK | 10 | 60% | NO CRACK | 0.4 | ACCEPTED | FAVORABLE |
| 104 | | 56 | 10 | 61% | NO CRACK | 10 | 61% | WITH CRACK | 0.4 | ACCEPTED | FAVORABLE |
| 105 | | 19 | 10 | 60% | NO CRACK | 11 | 61% | NO CRACK | 0.3 | ACCEPTED | FAVORABLE |
| 106 | | 70 | 10 | 60% | NO CRACK | 10 | 60% | WITH CRACK | 0.3 | ACCEPTED | FAVORABLE |
| 107 | | 65 | 10 | 60% | NO CRACK | 10 | 60% | WITH CRACK | 0.2 | ACCEPTED | FAVORABLE |
| 108 | | 17 | 11 | 62% | NO CRACK | 10 | 60% | NO CRACK | 0.3 | ACCEPTED | FAVORABLE |
| 109 | | 18 | 10 | 60% | NO CRACK | 10 | 60% | NO CRACK | 0.2 | ACCEPTED | FAVORABLE |
| 110 | | 49 | 10 | 61% | NO CRACK | 11 | 60% | WITH CRACK | 0.5 | ACCEPTED | FAVORABLE |
| 111 | | 20 | 10 | 62% | NO CRACK | 10 | 62% | NO CRACK | 0.4 | ACCEPTED | FAVORABLE |
| 112 | | 15 | 11 | 60% | NO CRACK | 10 | 60% | NO CRACK | 0.7 | ACCEPTED | FAVORABLE |
| 113 | | 14 | 12 | 62% | NO CRACK | 10 | 61% | NO CRACK | 0.7 | ACCEPTED | FAVORABLE |
| 114 | | 16 | 10 | 62% | NO CRACK | 11 | 61% | NO CRACK | 0.4 | ACCEPTED | FAVORABLE |
| 115 | | 15 | 10 | 60% | NO CRACK | 11 | 60% | NO CRACK | 0.5 | ACCEPTED | FAVORABLE |
| 116 | | 15 | 10 | 60% | NO CRACK | 10 | 62% | NO CRACK | 0.2 | ACCEPTED | FAVORABLE |
| 117 | | 19 | 10 | 63% | NO CRACK | 11 | 62% | NO CRACK | 0.4 | ACCEPTED | FAVORABLE |
| 118 | | 20 | 10 | 60% | WITH CRACK | 10 | 60% | NO CRACK | 1.7 | ACCEPTED | FAVORABLE |
| 119 | | 17 | 10 | 61% | NO CRACK | 10 | 61% | NO CRACK | 0.1 | ACCEPTED | FAVORABLE |
| 120 | | 16 | 11 | 61% | NO CRACK | 11 | 62% | NO CRACK | 0.3 | ACCEPTED | FAVORABLE |
| 121 | | 67 | 11 | 62% | WITH CRACK | 11 | 60% | NO CRACK | 1.7 | ACCEPTED | FAVORABLE |
| 122 | | 71 | 10 | 60% | NO CRACK | 12 | 62% | NO CRACK | 0.1 | FAILED | POOR |
| 123 | | 70 | 10 | 62% | NO CRACK | 10 | 60% | NO CRACK | 0.3 | FAILED | FAVORABLE |
| 124 | | 64 | 10 | 60% | NO CRACK | 10 | 60% | NO CRACK | 0.3 | ACCEPTED | POOR |
| 125 | | 16 | 10 | 60% | NO CRACK | 10 | 60% | NO CRACK | 0.2 | ACCEPTED | FAVORABLE |
| 126 | | 19 | 11 | 60% | NO CRACK | 11 | 62% | NO CRACK | 0.3 | ACCEPTED | FAVORABLE |
| 127 | | 64 | 10 | 60% | NO CRACK | 11 | 62% | NO CRACK | 0.2 | ACCEPTED | POOR |
| 128 | | 55 | 10 | 62% | NO CRACK | 10 | 60% | NO CRACK | 0.2 | ACCEPTED | POOR |
| 129 | | 59 | 10 | 60% | NO CRACK | 10 | 61% | NO CRACK | 0.2 | ACCEPTED | POOR |

As shown in Tables 8 and 9, Examples 1 to 31 were accepted to be excellent in all of toughness, cold-cracking resistance properties, hot-cracking resistance properties, the small amount of diffusion hydrogen, the amount of welding spatter, and welding workability. Moreover, Examples 1 to 30 could achieve a weld metal having excellent welding workability and excellent characteristics without performing preheating. Meanwhile, Comparative Examples 101 to 129 did not satisfy the factors regulated in the present invention and failed at least one of toughness, cold-cracking resistance properties, and welding workability.

INDUSTRIAL APPLICABILITY

A flux-cored wire according to the present invention can obtain a weld which has high strength and high toughness, excellent cold-cracking resistance properties, and a favorable bead shape. The generation amount of spatter during welding can be drastically reduced. A welding method according to the present invention can omit preheating work for preventing a cold crack of a weld metal or can lower the preheating temperature during preheating work, can prevent a hot crack of a weld metal, and can drastically reduce the generation amount of spatter. A welded joint according to the present invention includes a weld having high strength, high toughness, and a favorable bead shape. Particularly, in a case where the flux-cored wire according to the present invention and a manufacturing method of a welded joint according to the present invention are applied to a high carbon steel such as a wear resistant steel and a high alloy cast steel within HB450 to HB600 class, preheating work for preventing a cold crack can be omitted or the preheating temperature during preheating work can be lowered, and a hot crack is prevented. Moreover, even in a case where a shielding gas is 100% $CO_2$ gas, the generation amount spatter can be controlled. Therefore, welding efficiency can be remarkably improved, and the value in the industry is extremely high.

BRIEF DESCRIPTION OF THE REFERENCE SYMBOLS 1 gap

The invention claimed is:

1. A flux-cored wire comprising:
a steel sheath; and
a flux that fills the steel sheath,
wherein the flux contains:
fluorides which include one or at least two selected from the group consisting of $CaF_2$, $MgF_2$, $Na_3AlF_6$, LiF, NaF, $K_2ZrF_6$, $BaF_2$, and $K_2SiF_6$, wherein a value α, which is defined as a total value of F-equivalent values, is 0.21% or more with respect to a total mass of the flux-cored wire;
oxides which include one or at least two selected from the group consisting of Fe oxides, Ba oxides, Na oxides, Ti oxides, Si oxides, Zr oxides, Mg oxides, Al oxides, Mn oxides, and K oxides, while excluding CaO, wherein a value β, which is defined as a total value of amounts of oxides, ranges from 0.30% to 3.50% by mass % with respect to the total mass of the flux-cored wire; and
carbonates which include one or at least two selected from the group consisting of $MgCO_3$, $Na_2CO_3$, $LiCO_3$, $CaCO_3$, $K_2CO_3$, $BaCO_3$, $FeCO_3$ and $MnCO_3$, wherein a total value of amounts of carbonates ranges from 0% to 3.50% by mass % with respect to the total mass of the flux-cored wire,
wherein an amount of CaO in the flux ranges from 0% to 0.20% by mass % with respect to the total mass of the flux-cored wire,
wherein an amount of iron powder in the flux ranges from 0% to less than 10.0% by mass % with respect to the total mass of the flux-cored wire,
wherein an amount of $CaF_2$ is less than 0.50% by mass % with respect to the total mass of the flux-cored wire,
wherein an amount of Ti oxides ranges from 0.10% to 2.50% by mass % with respect to the total mass of the flux-cored wire,
wherein a ratio of the α to the β ranges from 0,10 to 4.00,
wherein a total value of amounts of the $MgCO_3$, the $Na_2CO_3$, and the $LiCO_3$ ranges from 0% to 3.00% by mass % with respect to the total mass of the flux-cored wire,
wherein a chemical composition excluding the fluorides, the oxides, the CaO, the carbonates, and the iron powder includes, by mass % with respect to the total mass of the flux-cored wire:
C: 0.003% to 0.030%,
Si: 0.10% to 1.50%,
Mn: 0.50% to 3.50%,
Mg: 0.10% or less,
P: 0.020% or less,
S: 0.020% or less,
Al: 0.001% to 0.100%,
Cu: 0% to 0.50%,
Ni: 0% to 0.50%,
Cr: 0% to 1.00%,
Mo: 0% to 1.00%,
Nb: 0% to 0,100%,
V: 0% to 0.40%,
Ti: 0% to 0.300%,
B: 0% to 0.0100%,
Bi: 0% to 0.0100%,
Ca: 0% to 0.50%, and
REM: 0% to 0.0100%,
while having a remainder comprising iron and impurities,
wherein a value of Y is 5.0% or less, and wherein Y is defined as:

$$Y=[NaF]+[MgF_2]+[Na_3AlF_6]+1.50\times([K_2SiF_6]\pm[K_2ZrF_6]+[LiF]+[BaF_2])+3.50\times([CaF_2]),$$

wherein chemical formulas with square brackets each indicate, by unit mass % with respect to the total mass of the flux-cored wire, an amount of fluoride corresponding to each of the chemical formulas; and
wherein a value of Ceq is from 0.10% to 0.44%, wherein said Ceq is defined as:

$$Ceq=[C]+[Si]/24+[Mn]/6+[Ni]/40+[Cr]/5+[Mo]/4+[V]/14,$$

wherein element symbols with square brackets each express, by unit mass % with respect to the total mass of the flux-cored wire, an amount of each element corresponding to each of the element symbols included in the chemical composition excluding the fluorides, the oxides, and the carbonates.

2. The flux-cored wire according to claim 1,
wherein the chemical composition excluding the fluorides, the oxides, the CaO, the carbonates, and the iron powder includes, by mass % with respect to the total mass of the flux-cored wire,
Mg: 0.07% or less.

3. The flux-cored wire according to claim 1,
wherein the chemical composition excluding the fluorides, the oxides, the CaO, the carbonates, and the iron powder satisfies:

([Mg]+10×[Al])≤0.45 wherein element symbols with square brackets each indicate, by unit mass % with respect to the total mass of the flux-cored wire, an amount of each element corresponding to each of the element symbols included in the chemical composition excluding the fluorides, the oxides, and the carbonates.

4. The flux-cored wire according to claim 1,
wherein the total amount of the carbonates ranges from more than 0.30% to 3.50%, and
wherein the total amount of one or at least two of the MgCO$_3$, the Na$_2$CO$_3$, and the LiCO$_3$ ranges from more than 0.30% to 3.00%.

5. The flux-cored wire according to claim 1,
wherein the total amount of the fluorides is 0.50% or more in terms of the F-equivalent value.

6. The flux-cored wire according to claim 1,
wherein the value of Y is 4.0% or less.

7. The flux-cored wire according to claim 1,
wherein the amount of the Ti oxides ranges from 0.10% to 1.80% by mass % with respect to the total mass of the flux-cored wire.

8. The flux-cored wire according to claim 1,
wherein the amount of the CaF$_2$ is 0.20% or less by mass % with respect to the total mass of the flux-cored wire.

9. The flux-cored wire according to claim 1,
wherein the ratio of the α to the β ranges from 0.50 to 2.50.

10. The flux-cored wire according to claim 1,
wherein the total amount of Na$_3$AlF$_6$ and NaF by unit mass % with respect to the total mass of the flux-cored wire is 50% or more of the total amount of the fluorides by unit mass % with respect to the total mass of the flux-cored wire.

11. The flux-cored wire according to claim 1,
wherein the steel sheath has a seamless shape.

12. The flux-cored wire according to claim 1,
wherein the steel sheath has a slit-shaped gap.

13. The flux-cored wire according to claim 1, further comprising:
perfluoropolyether oil that coats a surface of the flux-cored wire.

14. A manufacturing method of a welded joint, comprising:
performing gas shield arc welding of a steel material by using the flux-cored wire according to claim 1.

15. The manufacturing method of a welded joint according to claim 14,
wherein the steel material is a steel sheet of which a sheet thickness ranges from 12 to 100 mm, of which a C content ranges from 0,20% to 0.55% by unit mass %, and of which a value of CEN ranges from 020% to 0.70%; or a steel sheet of which the sheet thickness ranges from 12 to 20 mm, of which the C content ranges from 0.20% to 0.55% by unit mass %, and of which the CEN ranges from more than 0.70% to 0.85%, wherein the CEN is defined as:

CEN=[C]+(0.75+0.25×TAN H(20×([C]-0.12)))×([Si]/24+[Mn]/6+[Cu]/15+[Ni]/20+([Cr]+[Mo]+[Nb]+[V])/5+5×[B]), wherein element symbols with square brackets each express, by unit mass %, an amount of each element corresponding to each of the element symbols included in the steel material, and
wherein in a case where a temperature of the steel material is lower than 10° C. when the steel material is subjected to the gas shield arc welding, the gas shield arc welding is performed after the steel material is preheated such that the temperature thereof becomes 10° C. or higher; or in a case where the temperature of the steel material is 10° C. or higher when the steel material is subjected to the gas shield arc welding, the gas shield arc welding is performed without preheating the steel material.

16. The manufacturing method of a welded joint according to claim 14,
wherein the steel material is a steel sheet of which a sheet thickness ranges from more than 20 mm to 50 mm, of which a C content ranges from 0.20% to 0.55% by unit mass %, and of which a value CEN ranges from more than 0.70% to 0.8%, wherein CEN is defined as:

CEN=[C]+(0.75+0.25×TAN H(20×([C]-0.12)))×([Si]/24+[Mn]/6+[Cu]/15+[Ni]/20+([Cr]+[Mo]+[Nb]+[V])/5+5×[B]), wherein element symbols with square brackets each express, by unit mass %, an amount of each element corresponding to each of the element symbols included in the steel material, and
wherein the method further comprises preheating the steel material before the gas shield arc welding such that a temperature of the steel material becomes 100° C. or higher.

17. A welded joint which is obtained by the manufacturing method of a welded joint according to claim 14.

18. A flux-cored wire comprising:
a steel sheath; and
a flux that fills an inside of the steel sheath,
wherein an amount of diffusion hydrogen of a weld metal, which is obtained by performing direct current gas shield arc welding using the flux-cored wire under a condition regulated by JIS Z 3118, is 1.0 ml/100 g or smaller, and
wherein a weight per welding time of a spatter, which has a diameter of 1.0 mm or greater and is generated when direct current gas shield arc welding is performed by using the flux-cored wire under conditions that wire polarity is positive, a current value is 270 A, a voltage value ranges from 29 to 32 V, a welding rate is 30 cm/min; a type of a shielding gas is 100% CO$_2$ gas, and a flow rate of the shielding gas is 25 L/min, is 5.0 g/min or smaller.

19. A flux-cored wire comprising:
a steel sheath; and
a flux that fills an inside of the steel sheath,
wherein the flux-cored wire has an amount of Ti oxides ranging from 0.10% to 2,50% by mass % with respect to a total mass of the flux-cored wire and includes Ni: 0% to 0.5%,
wherein an amount of diffusion hydrogen of a weld metal, which is obtained by performing direct current gas shield arc welding using the flux-cored wire under a condition regulated by JIS Z 3118, is 1.0 ml/100 g or smaller, and
wherein a weight per welding time of a spatter, which has a diameter of 1.0 mm or greater and is generated when direct current gas shield arc welding is performed by using the flux-cored wire under conditions that wire polarity is positive, a current value is 270 A, a voltage value ranges from 29 to 32 V, a welding rate is 30 cm/min, a type of a shielding gas is 100% $CO_2$ gas, and a flow rate of the shielding gas is 2.5 L/min, is 5.0 g/min or smaller.

20. The flux-cored wire according to claim 2,
wherein the chemical composition excluding the fluorides, the oxides, the CaO, the carbonates, and the iron powder satisfies:

$$([Mg]+10\times[Al])\leq 0.45$$

wherein element symbols with square brackets each indicate, by unit mass % with respect to the total mass of the flux-cored wire, an amount of each element corresponding to each of the element symbols included in the chemical composition excluding the fluorides, the oxides, and the carbonates.

* * * * *